United States Patent [19]

Elabd et al.

[11] Patent Number: 4,598,321
[45] Date of Patent: Jul. 1, 1986

[54] CCD IMAGERS WITH REGISTERS PARTITIONED FOR SIMULTANEOUS CHARGE TRANSFERS IN OPPOSING DIRECTIONS

[75] Inventors: Hammam Elabd; Walter F. Kosonocky, both of Princeton, N.J.

[73] Assignee: RCA Corporation, Princeton, N.J.

[21] Appl. No.: 562,518

[22] Filed: Dec. 19, 1983

[51] Int. Cl.⁴ .............................................. H04N 3/14
[52] U.S. Cl. .................................................. 358/213
[58] Field of Search ................ 358/213, 212, 209, 41, 358/44; 357/24 LR; 250/578

[56] References Cited

U.S. PATENT DOCUMENTS 3,777,061 12/1973 Takemura ........................... 358/213
3,932,775 1/1976 Kosonocky ......................... 307/311
4,010,319 3/1977 Levine ................................. 358/213
4,280,141 7/1981 McCann et al. ................ 357/24 LR

OTHER PUBLICATIONS

U.S. Ser. No. 472,566 filed 3/07/83, Battson.

Primary Examiner—Gene Z. Rubinson
Assistant Examiner—Stephen Brinich
Attorney, Agent, or Firm—Joseph S. Tripoli; Robert L. Troike; Allen L. Limberg

[57] ABSTRACT

At selected times charge packets are simultaneously transferred to the two opposing ends of a charge transfer channel by application of suitable clocking voltages to the gate electrodes overlying that charge transfer channel. Charge packets are introduced into the charge transfer channel during intervening times either by photoresponse to incident radiation or by gating charge packets into respective positions in the charge transfer channel. The technique is especially useful in the A register or C register of a field transfer type of CCD imager.

33 Claims, 15 Drawing Figures

3-∅ ELECTRICALLY PARTIONED IMAGE REGISTER CLOCKING WITHOUT INTERLACE & INTEGRATING UNDER GATE ELECTRODES OF ONE PHASE

Fig. 8  3-∅ ELECTRICALLY PARTITIONED IMAGE REGISTER CLOCKING WITHOUT INTERLACE & INTEGRATING UNDER GATE ELECTRODES OF TWO PHASES

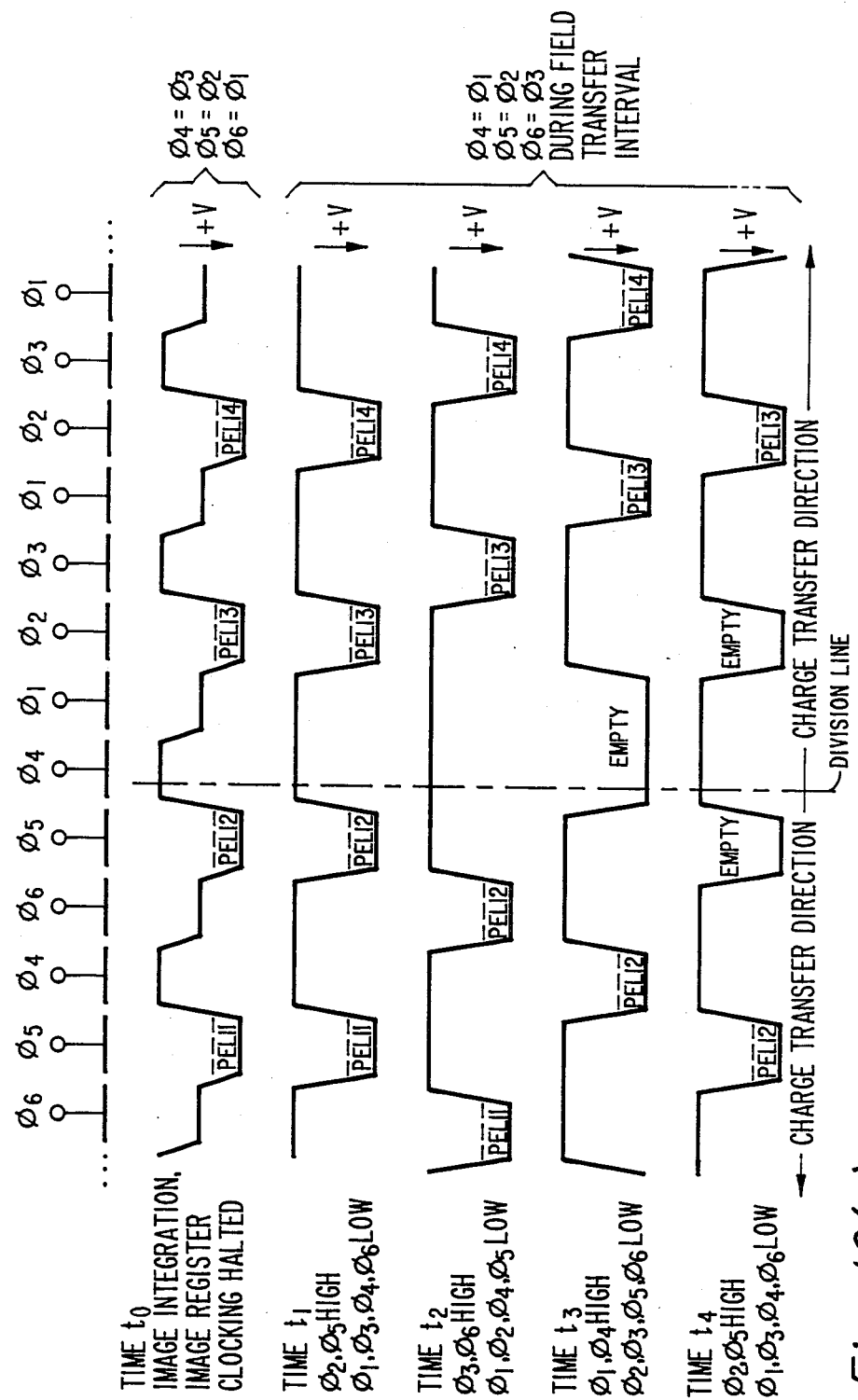

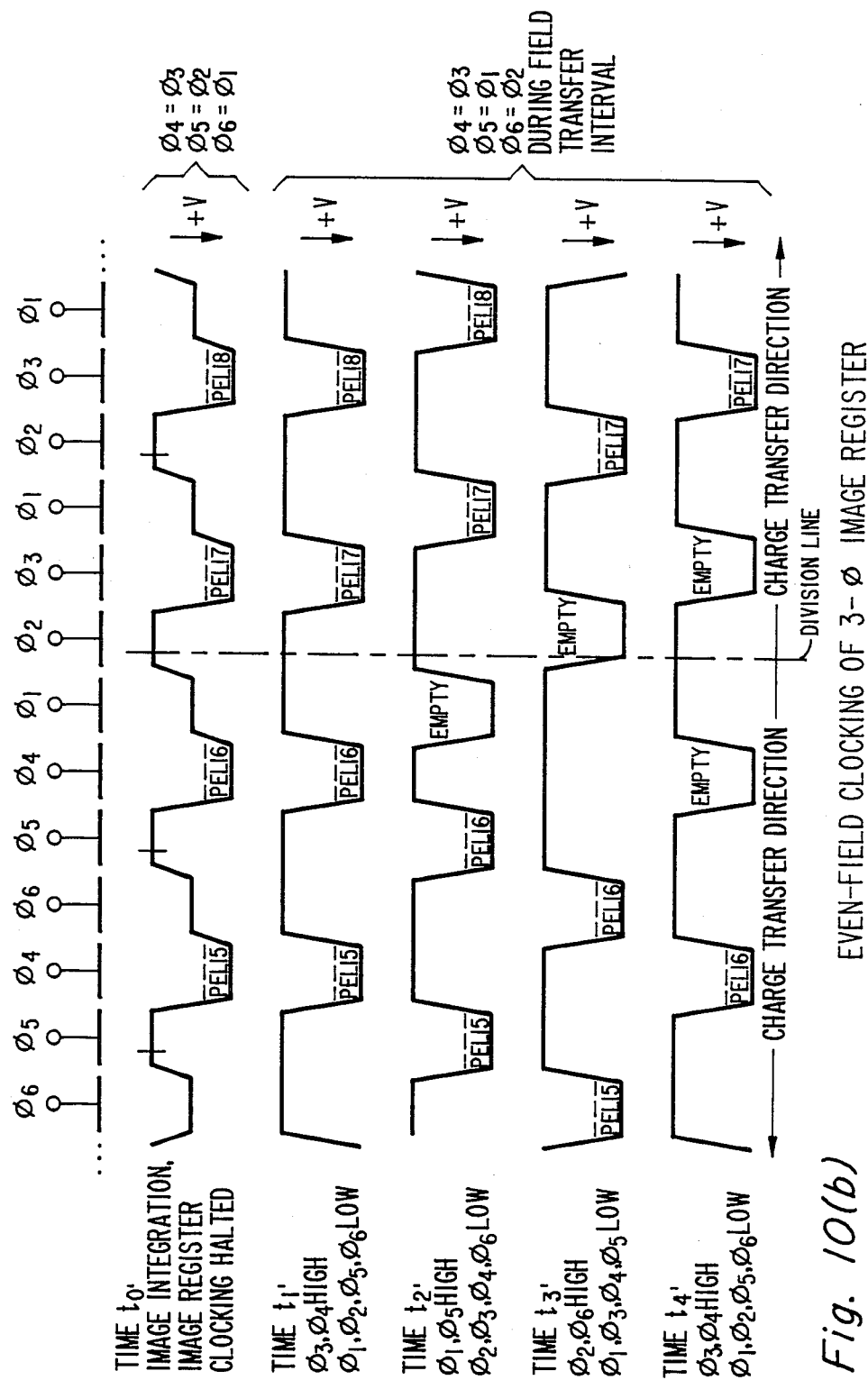

ODD-FIELD CLOCKING OF 4-∅ IMAGE REGISTER

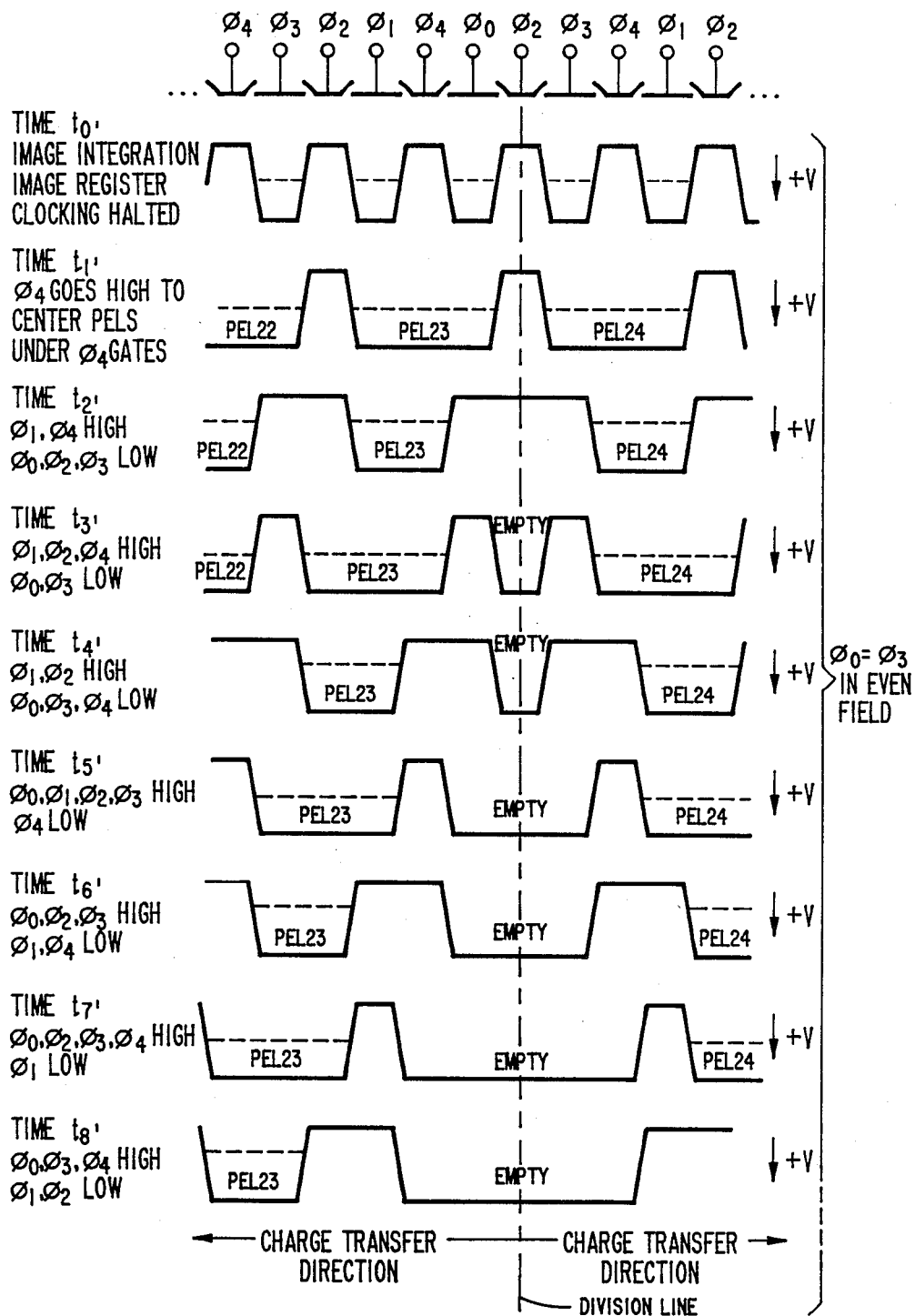

CCD IMAGERS WITH REGISTERS PARTITIONED FOR SIMULTANEOUS CHARGE TRANSFERS IN OPPOSING DIRECTIONS

The present invention relates to CCD imagers.

BACKGROUND OF THE INVENTION

In field-transfer-type CCD imagers present practice is to periodically transfer all the lines of charge descriptive of an image integrated over field times in an image (or A) register into a field storage (or B) register during intervening field retrace intervals. In each ensuing field trace interval the transferred charge is advanced in the field storage register a line at a time during line retrace interval. The charge packets descriptive of picture elements (pels) in the last line are transfered in parallel to a line-scanning (or C) register. During the following line trace interval the C register is clocked to supply the charge packets serially to its output stage for conversion to successive samples of CCD imager video signal output.

It is found to be desirable to shorten the time required for field transfer, without increasing the rate at which lines are clocked out of the image register. This is desirable for example when the A register has many lines of charge, as in a high-resolution imager, and the video signal standards restrict field retrace time. Shortening of field transfer time is, by way of further example, helpful in reducing transfer smear.

The phenomenon of transfer smear is described in U.S. Pat. No. 4,010,319 issued 1 Mar. 1977 to P. A. Levine and entitled SMEAR REDUCTION IN CCD IMAGERS, incorporated herein by reference. Transfer smear arises when the image register is exposed to radiation during the transfer of charge packets from image register to field storage register, because the photoresponse to the image at this time is misregistered with respect to the integrated photoresponses being transferred. The severity of transfer smear is known to be in direct proportion to the time taken for transfer of charges from image register to field storage register. However, limitations on the speed with which lines of charge can be clocked forward from image register to field storage register have hampered reduction of transfer smear in an unshuttered imager.

Levine teaches how to generate samples of smear response alone, to be differentially combined with samples of image response contaminated with smear for obtaining image response with reduced smear contamination. Electronic shutter schemes for back-illuminated CCD imagers, which employ a retarding field for photocarriers generated during field transfer are known. But these methods even in combination are only partially effective, and further reduction in field transfer times would help these methods provide acceptable smear reduction.

BRIEF SUMMARY OF THE INVENTION

The general teaching of the invention relates to the partitioning of CCD charge transfer registers to allow part of the charge packets in the register to be clocked in a first direction to a first output port at a first end of the register at the same time the remaining charge packets are clocked in a second direction (opposite the first direction) to a second output port at a second end (opposite the first end) of the register.

An aspect of the invention is embodied in CCD imagers of the field transfer type in which, during field transfer times, the lines in one half of the image register (a first A/2 register) are clocked in one direction towards a first half-field storage (or first B/2) register, and the lines in the other half of the image register (a second A/2 register) are clocked in the opposite direction towards a second half-field storage (or second B/2) register located at the opposite end of the image register from the first half-field storage register. This halves the time for field transfer at given line transfer rate. The first and second half-field storage (or B/2) registers are provided with respective C registers.

Where the C registers are located at the ends of the B/2 registers remote from the A/2 registers, the half of the field supplied from one C register is reversed in line sequence from the half of the field supplied from the other C register. A further half field store written line-by-line in a first sequence and read in a second and opposite sequence is used to reverse one of the half fields when half field read-out takes half field trace time. The half fields stored in the two B/2 registers are both clocked out of the CCD imager in the first half of field trace, using their respective C registers.

In another aspect of the invention additional half-field storage memories in time-division multiplex provide for scan conversion to normal raster scan of the two parallel C register output signals, and the B/2 registers are both clocked out of the CCD imager over a full field trace time at half normal line scan rate through their respective C registers. This reduces the clocking frequency of the C registers during line scan, improving their transfer efficiency and lowering their consumption of power. And where the additional half-field stores are digital memories external to the CCD imager, this advantageously reduces the conversion rate of the analog-to-digital converters used after the C registers.

In a further aspect of the invention C registers can each be partitioned into halves (C/2 registers) then provided output stages at both ends, to halve line transfer rate again. The scan converter is then modified also to include time-division-multiplexed half-line stores for each C/2 register output. The partitioning of the C registers can be carried out conventionally using channel stops between halves, but preferably is carried out without any physical barrier between C register halves, separating the register halves electrically in accordance with the general teaching of the invention.

The invention has still further aspects with regard to the details of providing field interlace together with image partitioning for charge transfer in opposite directions. The register partitioning methods of the invention are also useful in other applications.

BRIEF DESCRIPTION OF THE DRAWING

FIGS. 7, 8, 9, 10 and 11 are each a series in time of potential profile diagrams for CCD registers which are split for opposite charge transfer directions in accordance with the invention, the series of potential profiles being respectively for registers of the three-phase non-interlaced-video integrating under single gates, three-phase non-interlaced video integrating under pairs of gates, two-phase non-interlaced video, three-phase field-interlaced-video and double-clocked-four-phase field-interlaced-video types; and each of FIGS. 12 and 13 is a block diagram of a CCD imager of interline transfer type constructed in accordance with the invention.

Each of the FIGS. 10 and 11 have an (a) portion depicting clocking of the image register with regard to odd-numbered fields of the field-interlaced-video and having a (b) portion depicting clocking of the register with regard to even-numbered fields.

DETAILED DESCRIPTION

Figure 1:
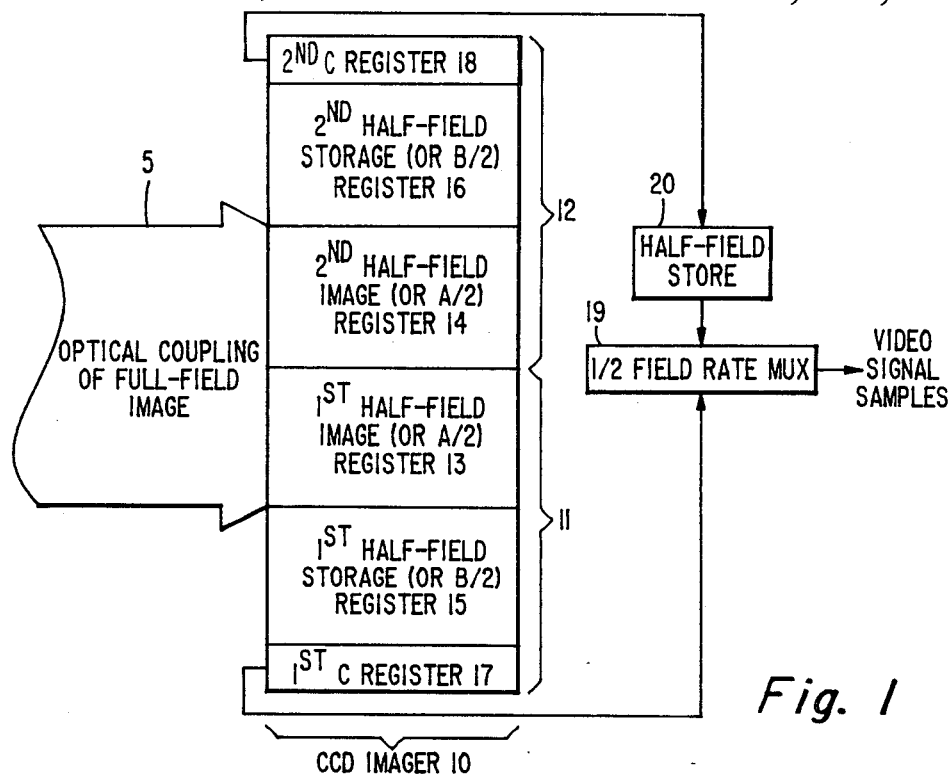
FIG. 1 is a block diagram of a CCD imager architecture in which, in accordance with the invention, halves of the image (or A) register are clocked in opposite directions to respective half-field storage registers.

In FIG. 1 there is optical coupling 5 of full field image (via a lens system, typically) to CCD imager 10. Imager 10 in effect comprises, preferably on a single semiconductor substrate, two component CCD imager sections 11 and 12, each of field transfer type, imaging respective halves of the full field. To this purpose, image half-field image registers 13 and 14 of component imagers 11 and 12 abut at the ends opposite their respective connections to respective half-field storage registers 15 and 16 of component imagers 11 and 12. During image integration times, charge carriers are generated by photoconversion of the radiant-energy image impinging on image registers 13 and 14 and are collected in the charge transfer stages of image registers 13 and 14 to form respective charge packets representative of the intensity of image pels. Photoconversion takes place in the paralleled charge transfer channels of image registers 13 and 14 and in the underlying semiconductor substrate. The paralleled charge transfer channels in image registers 13 and 14 are essentially perpendicular to the ends of those registers which abut with the ends of half-field storage registers 15 and 16. The paralleled charge transfer channels in image registers 13 and 14 are in essentially straight-line alignment with corresponding paralleled charge transfer channels both in half-field storage register 15 and in half-field storage register 16. During field transfer times lines of charge packets descriptive of image pels in the upper half of image are clocked downward through first half-image register 13 and into first half-field storage register 15; and lines of charge packets descriptive of image pels in the lower half of image are clocked upward through second half-image register 14 and into second half-field storage register 16.

Despite halves 13 and 14 of the image register abutting on the same substrate, there is the problem of separating the sets of charge packets respectively. describing the top and bottom halves of the image without introducing a noticeable discontinuity in a television image reconstructed from the video samples supplied from CCD imager 10; this problem is even less tractable where field interlace is used, and the division line between upper and lower portions of the image changes on alternate fields. It is desirable to be able to transfer charges in opposite directions in the upper and lower halves of the charge transfer channels of the image register, then, without introducing physical separation between the image register halves 13 and 14 as would tend to cause noticeable discontinuity in a television image reconstructed from charge samples taken from them. It is highly desirable to maintain the regularity of potential energy well pattern across the surface of the image register during image integration. Later in this specification ways are described to maintain that regularity and at the same time accurately separate image halves, which ways fundamentally depend only on how clocking voltages are applied to the regular structure of gate electrodes overlying the image register.

In component imager 11 the end of its half-field storage register 15 remote from its half-field image register 13 is connected for parallelly loading charge packets in a line register 17 for conversion to serial read-out, line register 17 performing as C register for component CCD imager 11. In component imager 12 the end of its half-field storage register 16 remote from its half-field image register 14 is connected for parallelly loading charge packets into a line register 18 for conversion to serial read-out, line register 18 performing as C register for component imager 12. The complete image or A register of the composite CCD imager 10, then, is divided into halves 13 and 14, which half-field image registers will be denominated "A/2 registers". And the half-field storage registers 15 and 16, which will be denominated "B/2 registers", make up the complete field storage, or B, register of composite CCD imager 10.

As to details of the actual physical structure of CCD imager 10, charge transfer channels are defined in the surface of a semiconductor substrate or in an interface between oppositely doped layers of the substrate, the defining being done by channel stops disposed in the substrate along the boundaries of the charge transfer channels. A plurality of charge transfer channels are parallelled to form the columns of the image or A register, and a succession of parallel gate electrode structures are disposed on an insulating layer on the "front" surface of the semiconductor substrate so as to cross these columns. The patterns of clocking voltages applied to the gate electrodes during image integration times, when dynamic clocking of the image register is suspended, define "rows" in the image register corresponding to the scan lines of the raster-scanned video output of the CCD imager.

The photoconversion of the full-field image into charge packets descriptive of image pels can take place in potential energy wells induced in the semiconductive substrate itself by the potentials applied to the image register gate electrodes during image integration times, with radiation being introduced into the front surface of the semiconductive substrate through transparent gate electrodes or being introduced into the back surface of a suitably thinned semiconductive substrate. Alternatively, photoconversion can take place in photo-responsive elements selectively connected to dump charge packets descriptive of image pels into adjoining locations in the charge transfer channels of the image register; in this alternative the charge transfer channels may be masked from incident image though the photoresponsive elements are, of course, unmasked. Each of the half-field storage registers 15 and 16 also comprises a plurality of parallelled charge transfer channels, which are in effect extensions of corresponding charge transfer channels in the A register. Each of the half-field storage registers 15 and 16 further comprises a respective succession of gate electrodes across these charge transfer channels.

During field transfer times the gate electrodes of the half-field storage registers 15 and 16 are dynamically clocked in synchronism with the gate electrodes of the portions 11 and 12 of the image register from which the register 15 and 16 respectively receive (a row at a time) charge packets descriptive of lines of image pels. The row-by-row clocking of these registers is at a relatively high rate to fit within field retrace time and, in the case where the imager is unshuttered during field retrace, to reduce transfer smear. Transfer smear tends to occur not only in imagers where photoconversion is done in the charge transfer channels themselves, but also owing to stray charge effects in imagers with separate photoresponsive elements.

During image integration time, when the application of dynamic clocking potentials to the gate electrodes of the image register is halted, the gate electrodes in half-field storage registers 15 and 16 have dynamic clocking signals applied to them at lowered clocking rate to advance rows of charge therein a line of image pels at a time during line retrace. The last rows of charge in the half-field storage registers 15 and 16 are clocked forward into the respective C registers 17 and 18. These line registers 17 and 18 receive from half-field storage registers 15 and 16 charge packets in parallel during line retrace, which charge packets are descriptive of a line of image pels. During the succeeding line trace, portions of C registers 17 and 18 operate as shift registers to serially transfer these lines of charge packets one at a time at pel scan rate to their respective output stages, which respond with respective video outputs sampled at pel scan rate.

At the same line-by-line transfer rate from A register to B register, composite CCD imager 10 can complete field transfer in half the time of a conventional imager, if the half-fields are transferred simultaneously. Whether or not the half-fields are transferred simultaneously, for given line-by-line rate of transfer, the number of lines of time for field-transfer smear charges to accumulate is halved.

A/2 register to B/2 register transfers preferably both occur within field retrace, so the coupling to C registers of the fast clocking associated such transfer does not capacitively couple through imager substrate to interfere with image read-out during line trace. B/2 register 15 during the first half of field trace transfers to C register 17 the charge packets that were previously transferred to it after having been generated in A/2 register 13 responsive to the top half of the image (conventional image-reversing optics being assumed in optical coupling 5). This transfer is done in parallel, a line at a time, during line retrace; and C register 17 is read serially during line trace to supply output video signal samples via a time-division multiplexer 19 switched at half-field rate.

Line-by-line transfer from B/2 register 16 to C register 18 and serial read-out from C register 18 via multiplexer 19 to supply video signal samples during the second half of field trace does not provide continuous line-by-line sampling of the full image field as desired to provide raster-scanned output video signal samples. C register 18 output must be supplied to multiplexer 19 via the agency of a half-field store 20, a memory written line-by-line in one sequence and read line-by-line in opposite sequence, to provide such continuous line-by-line sampling continuing from the first half of field trace through the second half of field trace. The writing of half-field store 20 is conveniently done during the first half of field trace, operating B/2 registers 15 and 16 in synchronism and C registers 17 and 18 in synchronism.

Half-field store 20 may store samples in analog form, a CCD memory located on a separate semiconductor substrate from CCD imager 10 being a suitable type of memory, for example. Where the analog signal samples from C registers 17 and 18 are to be ultimately digitized, half-field store 20 can be a digital memory storing digitized samples supplied it by an analog-to-digital converter used after C register 18.

Figure 2:
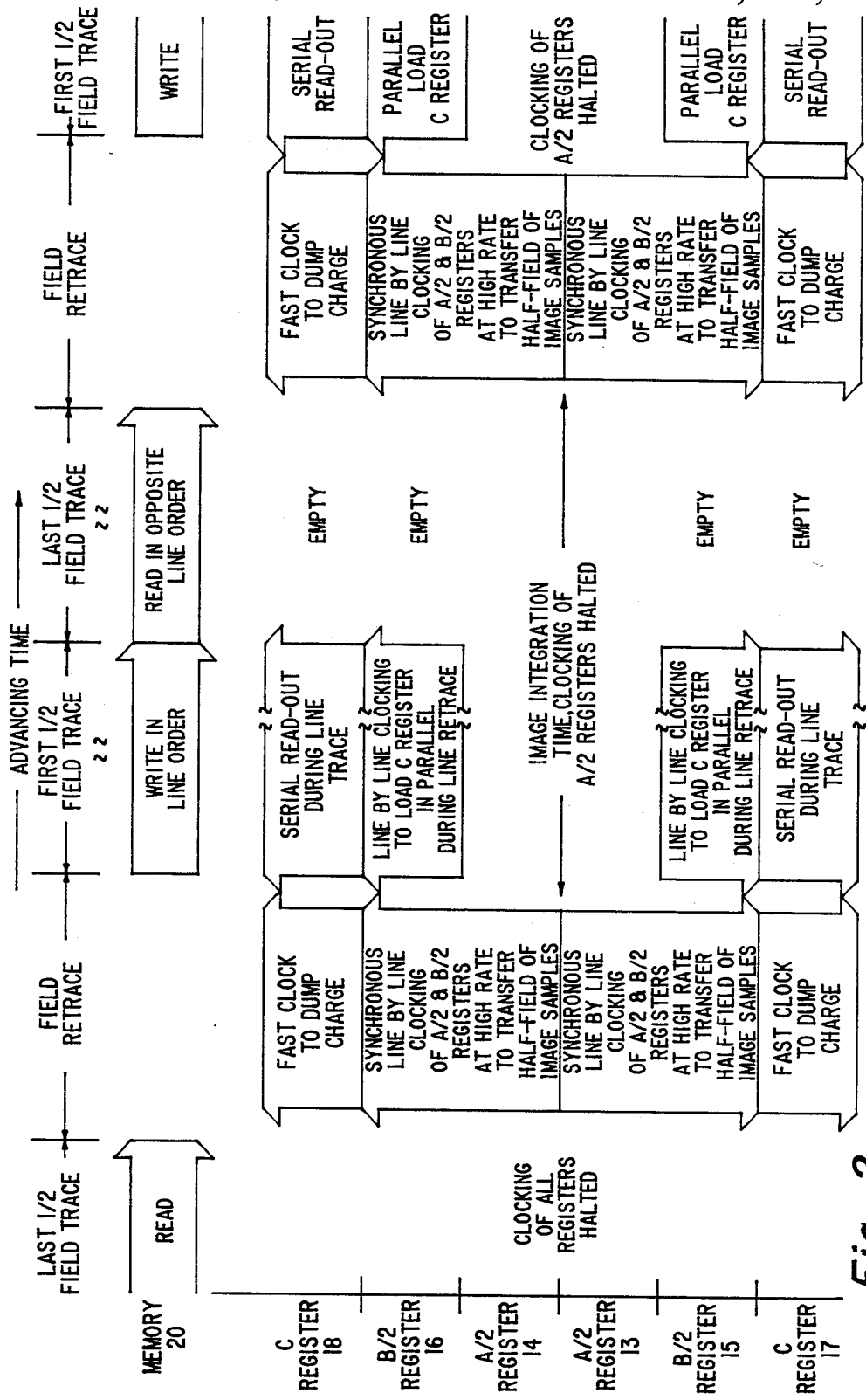
FIG. 2 is an overall clocking diagram for typical operation of the FIG. 1 imager.

FIG. 2 is a clocking diagram of typical operation for the FIG. 1 imager system. Half-field store 20 is written line-by-line in reverse normal line order during the first half of the field trace interval with samples serially supplied from C register 18 during each line trace time. Half-field store 20 is then read line-by-line in normal line order during the second half of field trace interval. During the second half of field trace interval the halt in clocking of the A/2 registers 13 and 14 that has taken place during the first half interval continues, and photocharge descriptive of image continues to be accumulated in these registers. During the second half of field trace the clocking of the B/2 registers 15 and 16 and the clocking of C registers 17 and 18 is also halted, the information stored in B/2 register 16 concerning the second half of the preceding field having already been transferred via C register 18 to write the memory 20 during the first half of that pre-ceding field.

Field transfer takes place within the field retrace time following the second half of field trace. A/2 register 13 and B/2 register 15 are clocked synchronously at relatively high line transfer rate to transfer the upper half of the image from A/2 register 13 to B/2 register 15. Remnant charge in B/2 register 15 owing to integrated dark current is clocked out of imager portion 11 by C register 17 operated at very high clock rate. (Alternatively, piling up of remnant charge in the last line of B/2 register may be allowed, with these lines of piled-up charge being clocked out after field transfer and before image lines are clocked out during field trace.) A/2 register 14, B/2 register 16, and C register 18 of imager portion 12 operate similarly to A/2 register 13, B/2 register 15 and C register 17, respectively, of imager portion 11, except for the clocking phases being chosen so the direction of field transfer in imager portion 12 is opposite that in imager portion 11.

During the first half of the next field trace time, clocking is again halted in A/2 registers 13 and 14. Clocking continues in the remaining registers at slowed rate. The transferred charge packets descriptive of the top half of the image integrated in the previous field trace time are clocked a line at a time from B/2 register 15 during line retrace to parallelly load C register 17. From C register 17 output samples are serially supplied during ensuing line trace and routed through multiplexer 19 during the first half of field trace to provide the video signal samples supplied as output from the FIG. 1 apparatus. The transferred charge packets descriptive of the bottom half of the image integrated during the previous field trace time are moved through B/2 register 16 and C register 18 to supply the signal samples to write into the half-field store 20. The cycle of operation iterates, as the second half of field trace occurs again; and samples descriptive of the bottom half of the image integrated during the previous field are read from half-field store 20 to multiplexer 19 in line order which in opposite to the order in which they were written.

The integration of dark current in the B register of a CCD imager with the conventional architecture of a full A register followed by a full B register followed by a C register results in a ramp from top to bottom in the video output signal, which tends to appear as slight field shading in a television picture reconstructed from that video output signal. When the FIG. 1 CCD imager is operated according to FIG. 2 dark-current ramps will appear in each half-field, but their final amplitudes will tend to be half the final amplitude of the dark current ramp developed with the conventional CCD imager architecture.

Figure 3:
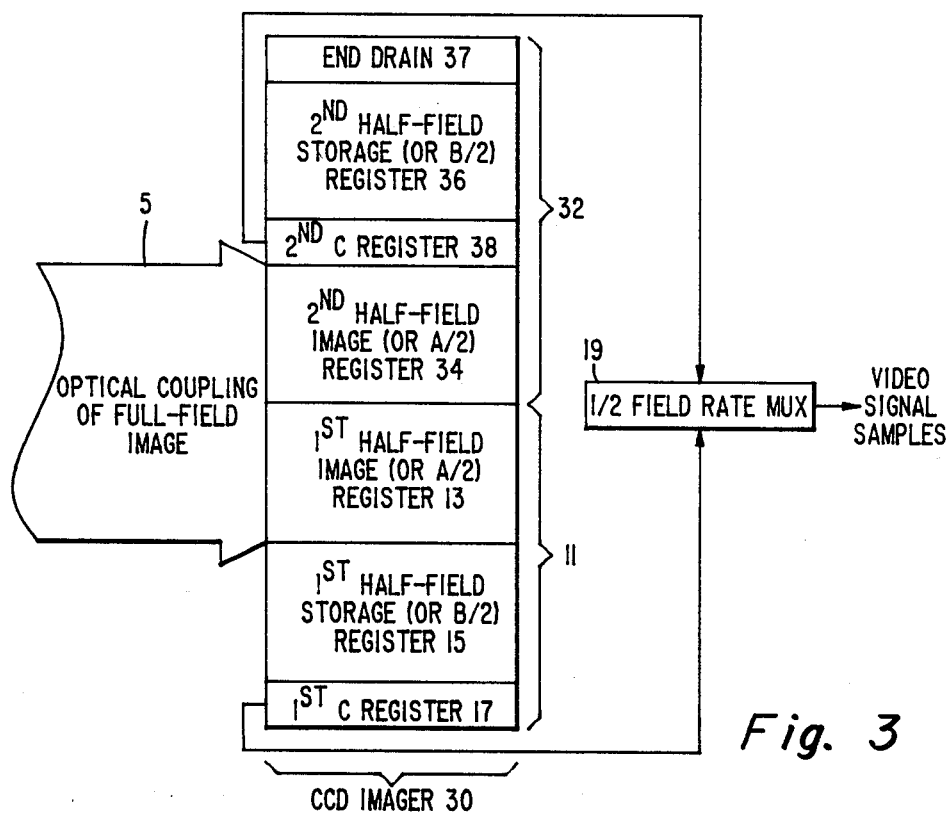
FIG. 3 is a block diagram of another CCD imager architecture alternative to that of FIG. 1.

FIG. 3 shows composite CCD imager 30 using a different architecture to avoid the need for an additional half-field store. Composite CCD imager 30 includes, in addition to a component CCD imager 11 as used in the previously described composite CCD imager 10, a component CCD imager 32 of the type having its half-field image (or A/2) register 34 and its half-field storage (or B/2) register 36 on opposing sides of its C registers 38. The B/2 register 36 has an end drain 37 on its end opposite C register 38.

The composite CCD imager 30 bears some resemblance to a CCD imager previously described by Y. Takemura in U.S. Pat. No. 3,777,061 issued 4 Dec. 1973 and entitled SOLID STATE IMAGE PICKUP DEVICE. Takemura describes an imager having an image pickup section (or A register) with conventional read-out storage section (or B register) and line scanning section (or C register) at one of its ends, but with the other of its ends and a second read-out section being on opposite sides of a line scanning section. The Takemura imager is used for providing two separate full-field images in sequence or in parallel. So the read-out storage sections have full field storage capability. The entire contents of the image pick-up section (i.e. the entire contents of the A register) are read out to one of the two read-out sections, with the entire charge transfer being in one direction.

For each image field the integrated charge packets in each of the halves 34, 13 of the image register of CCD imager 30 (like the integrated charge packets in each of the halves 14, 13 of the image register of the CCD imager 10 of FIG. 1) are transferred in opposite directions to the charge packets in the other image register half. The directions of charge transfer do not alternate from field to field as in the Takemura imager. The two image register read-out storage sections 15,36 in CCD imager 30, like those in CCD imager 10, are not full-field B registers as in the Takemura imager. Instead they are half-field storage (B/2) registers.

Operation of CCD imager 30 requires that field transfer from second A/2 register 34 occur during field retrace or the first half of field trace. It is most practical to arrange for field transfer from A/2 register 34 during field retrace, to avoid the problem of electrostatic coupling of the field transfer clocking through imager substrate to first C register 17 output interfering with its read-out.

Figure 4:
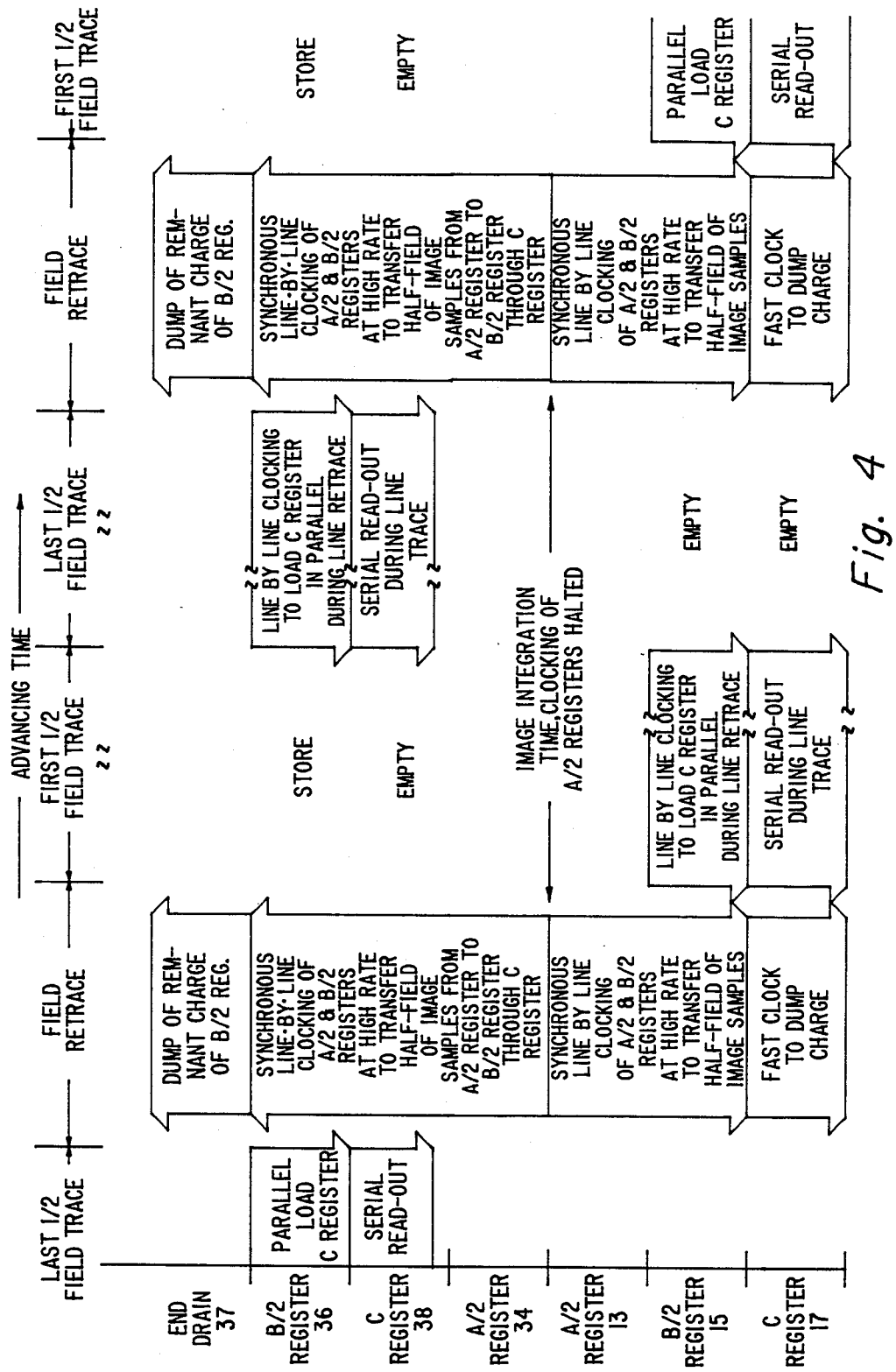
FIG. 4 is an overall imager clocking diagram for typical operation of the FIG. 3 imager.

FIG. 4 is a clocking diagram of the operation of the FIG. 3 imager being carried out in this manner. It is convenient to clock the A/2 registers 13 and 34 at the same time during field retrace, and at the same clocking frequency, in respective phases appropriate to the opposite directions of charge propagation in A/2 register 13 and 34. The transfer of charge from A/2 register 34 is through second C register 38 into B/2 register 36, which B/2 register 36 is clocked in synchronism with A/2 register 34 during field transfer.

Remnant charge in B/2 register 36 owing to dark current integration is clocked into end drain 37. End drain 37 is not necessary if B/2 register 36 has extra lines at its end remote from C register 38. Remnant charge can be piled up in those lines and removed at end of field trace.

During the first half of field trace in imager 30, as in imager 10 of FIG. 1, the first half-field storage register 15 is clocked line-by-line to parallelly load the first C register 17 during line retrace; and during the ensuing line trace, C register 17 is operated as a shift register shifting charge packets at pel scan rate to supply a series of output video signal samples descriptive of a line of the image. In imager 30 the second half-field storage (or B/2) register 36, in contrast to B/2 register 16 of imager 10, is not clocked for charge transfer during the first half of field trace. The charge packets descriptive of the bottom half of image are held in store in B/2 register 36 through the first half of field trace.

B/2 register 36 is clocked line-by-line during the second half of field trace to parallelly load the second C register 38 during line retrace. Then, during ensuing line trace, C register 38 is operated as a shift register shifting charge packets at pel scan rate to supply a series of output video signal samples descriptive of a line of the image. B/2 register 15 and C register 17 hold only remnant charge due to dark current integration, and their clocking can be halted.

Multiplexer 19 is switched at half field rate to select its output video signal samples from first C register 17 during the first half of field trace and from second C register 38 during the second half of field trace. Clocking is halted during field trace in both A/2 registers 13 and 34, comprising the entire image register of CCD imager 30, to permit charge integration for a full field trace time plus in many cases a portion of field retrace time. In many cases, the halving of the time for field transfer made available by the invention usually is accomplished in the framework of a television system having prescribed lengths of time for field trace and retrace; so the reduction of field retrace time to coincide with the minimization of the time required for field transfer is precluded.

Rather than attempting to eliminate the half-field store 20 needed in the operation of the FIG. 1 CCD imager 10, one may provide additional storage to be used for scan conversion in connection with the operation of CCD imager 10. If proper scan conversion is employed, one will note referring back to FIG. 2 clocking diagram, that the parallel read-out of B/2 registers 15 and 16 via their respective C registers 17 and 18 can be extended to take up the full field trace period rather than just the first half of field trace. This halves the clocking rates of B/2 registers 15 and 16 and (more importantly) of C registers 17 and 18 during image read-out. So charge transfer efficiency in the C registers 17 and 18 can be improved, which is especially important where the number of pels per line climbs to $2^{10}$ or so.

Figure 5:
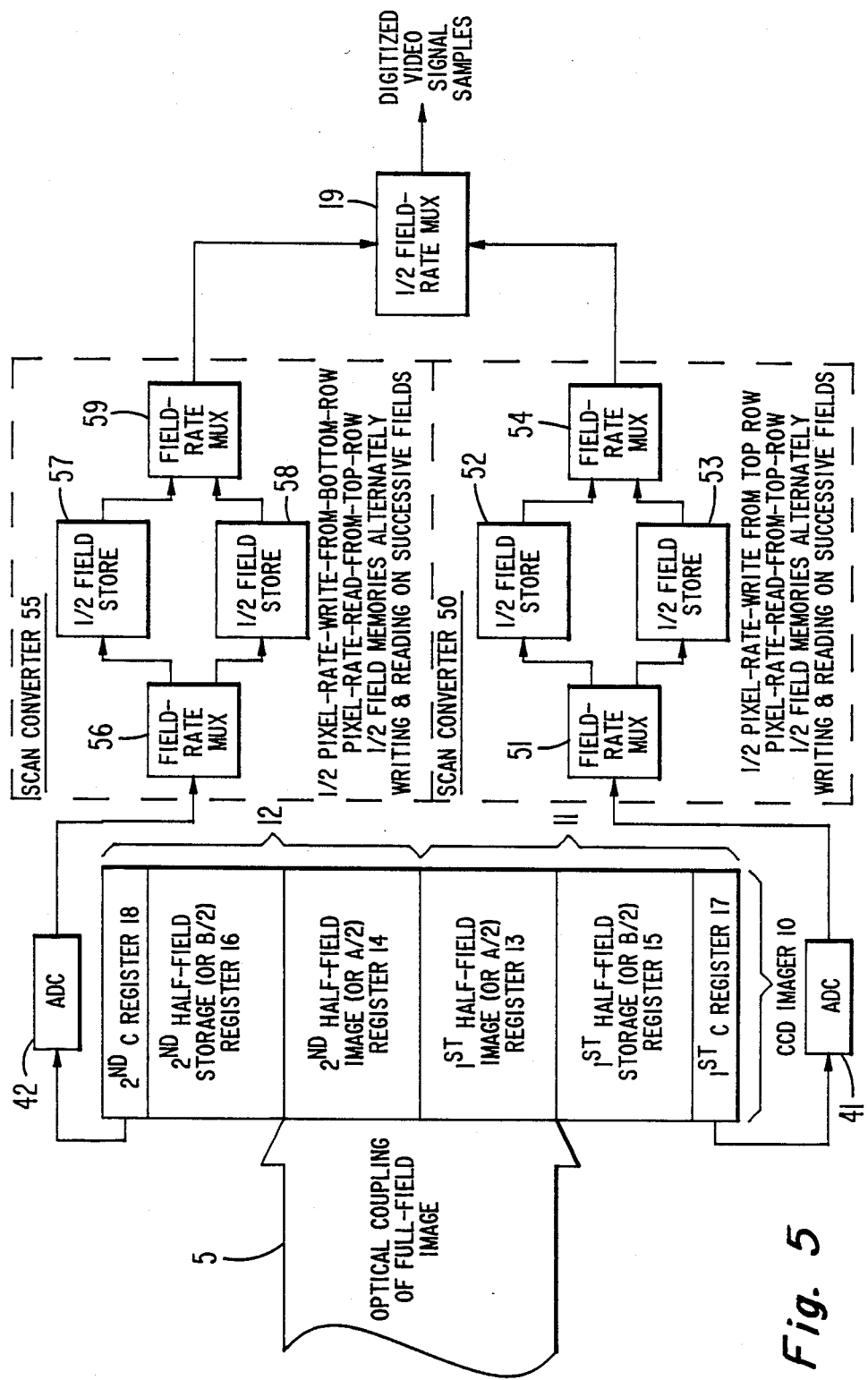
FIG. 5 is a block diagram of the FIG. 1 CCD imager architecture in combination with scan conversion apparatus to provide apparently high rate read-out from the CCD imager in accordance with an aspect of the invention.

FIG. 5 shows a representative scan conversion scheme of the type just described. The analog output signal samples from C registers 17 and 18 are digitized in analog-to-digital converters (ADC's) 41 and 42, respectively, to facilitate the use of digital memory in scan converters 50 and 55 which convert the half-normal scan rate C register output signals to normal scan rate for application to half-field-rate multiplexer 19.

Scan converter 50 performs just a scan rate doubling, the digitized video samples from ADC 41 being time-division-multiplexed by a field-rate multiplexer 51 to write alternate ones of half-field stores 52 and 53 on alternate fields, writing being at half-normal scan rate. The one of half-field stores 52 and 53 not being written into during any field trace interval is read at normal scan rate during the first half of that field trace and provides half-field-rate multiplexer 19 its first-half-of-field input.

Scan converter 55 not only performs a scan rate doubling, but also provides the reversal of row-scan formerly provided by half-field store 20 in the FIG. 1 combination. A field-rate multiplexer 56 in scan converter 55 selects alternate ones of the half-field stores 57 and 58 for writing at half-normal scan rate on alternate fields. But the order of writing lines into the selected one of half-field stores 57 and 58 is opposite to the order of its being read-out at normal rates during the latter half of the succeeding field trace. Field-rate multiplexer 59 selects the read-out of the one of field stores 57 and 58 then available to supply half-field-rate multiplexer 19 its second-half-of-field input. (One skilled in the art of digital electronics design will appreciate that the multiplexers 19, 51, 54, 56 and 59 can be subsumed into the read/write control of the digital memories used for half-field stores 52, 53, 57 and 58 and will then not appear as the separate circuit elements shown for purposes of facilitating explanation of this aspect of the invention.)

Figure 6:
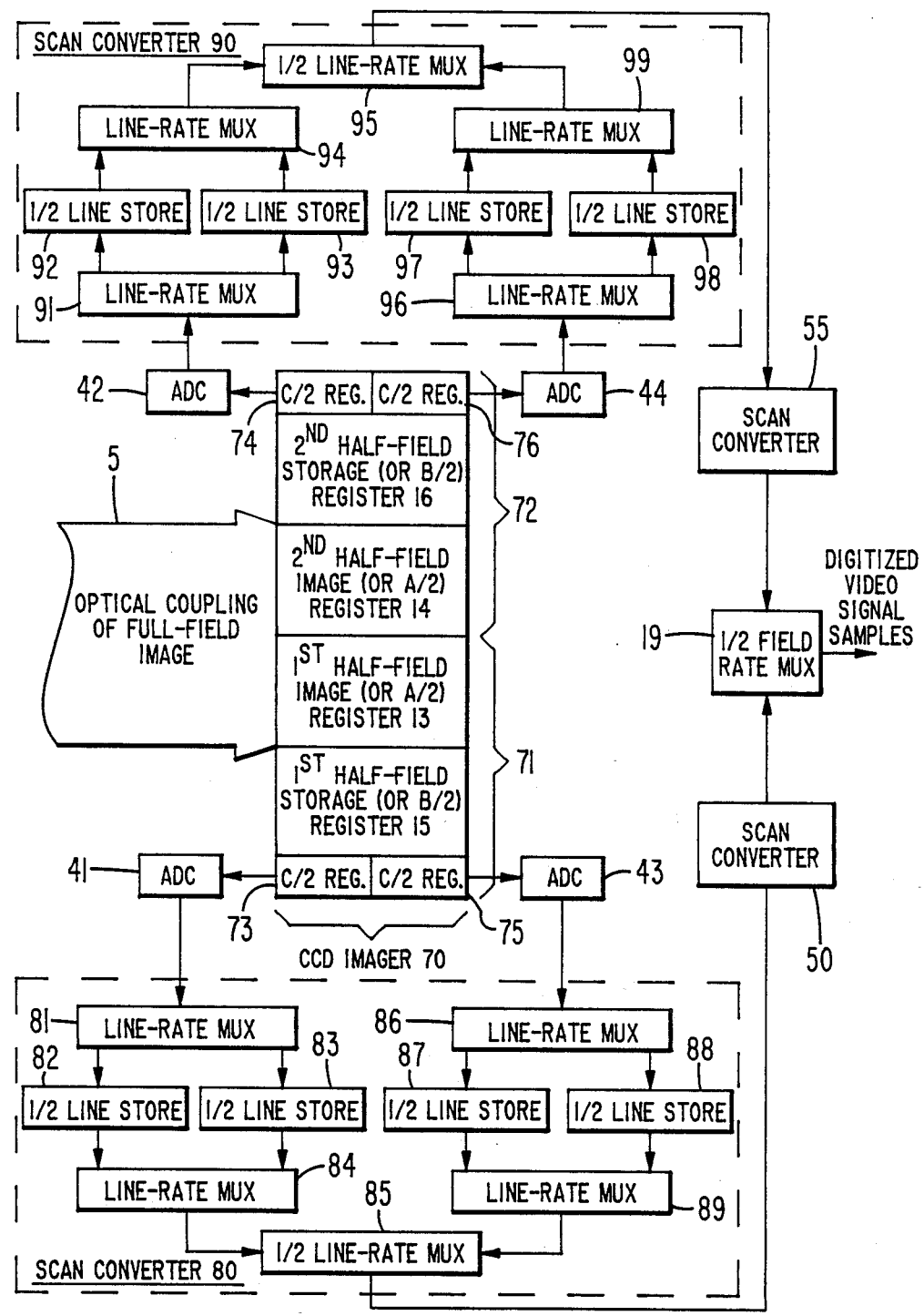
FIG. 6 is a block diagram of the FIG. 5 apparatus imager after its having been modified to use partitioned C registers, to provide apparently still higher rate readout from the CCD imager in accordance with an aspect of the invention.

FIG. 6 shows how one can further extend the idea of reducing the speed requirements on the B and C registers by partitioning the B register. Rather than the B register being partitioned so only two portions of it are read out in parallel, the B register can be partitioned so four portions of it are read out in parallel. CCD imager 70 is like CCD imager 10 of FIG. 1 except that: imager half 71 has two half-line C/2 registers 73 and 75 in place of the full-line C register 17, and imager 72 has two half-line C/2 registers 74 and 76 in place of the full-line C register 18.

The C/2 register 73 is parallelly loaded a-line-a-time during line retrace with charge packets from only the lefthand side of B/2 register 15 and transfers these charge packets serially to ADC 41. This serial transfer is permitted to take a full line trace time, rather than only one-half line trace time, which halves again output register read-out clocking rate. This is much appreciated when the number of pel samples per line is great ($2^{10}$ or so).

The speed requirement on the parallel transfer of charge packets into an output register, of course, does not change as the number of charge packets transferred increases. It is the clocking of serial output from the output line registers that presents a greater difficulty as the number of samples per line in CCD imager output signal increases.

The charge packets from the righthand side of B/2 register 15 are used to parallelly load C/2 register 75 a-line-at-a-time during line retrace, and during the following line trace the charge packets in that line are serially read out to an ADC 43. A scan converter 80 is used to double the line scan rate to be what it would have been with the C register 17 that C/2 registers 73 and 75 replace. Output video samples from ADC 41 are time-division-multiplexed by a line-rate multiplexer 81 to load alternate ones of half-line stores 82 and 83 on alternate line traces. A line-rate multiplexer 84 selects the one of half-line stores 82 and 83 not being written, for read-out at doubled clock rate to supply first-half-of-line input to a half-line rate multiplexer 85. Output video samples from ADC 43 are time-division-multiplexed by a line-rate multiplexer 86 to load alternate ones of half-line stores 87 and 88 on alternate fields. The order of writing into the selected one of half-line stores 87 and 88 during a line trace is opposite to the order of its being read out during the latter half of the following line trace to be applied via line-rate multiplexer 89 as the second-half-of-line input to half-line-rate multiplexer 85. The output of half-line-rate multiplexer 85 supplies to scan converter 50 the same signal samples as C register 17 supplies as in the FIG. 5 combination.

The other half-field storage (or B/2) register 16 of CCD imager 70 in FIG. 6 is read-out similarly, through C/2 registers 74 and 76. The analog output samples from C/2 registers 74 and 76 are digitized in ADC's 42 and 44, respectively, and supplied to scan converter 90 to generate the same input samples for scan converter 55 as are supplied for it by C register 18 in the FIG. 5 combination. Scan converter 90 has elements 91–99 corresponding to elements 81–89 of scan converter 80. One skilled in the art of digital hardware design will appreciate that the functions scan converters 50, 55, 80 and 90 provide can also be provided by alternate reading and writing of two full-field stores, each quartered for access so as to permit reading and writing to take place in opposite sequences.

One provided with the disclosure should appreciate that the partitioning of the B register into halves or quarters as far as read-out of charge packets therefrom is concerned a powerful technique for reducing clocking rate in high-resolution CCD imagers, even where shuttering of the image register makes it unnecessary to partion the image register for transfer smear reduction. A CCD imager of field transfer type having a partitioned B register with C registers at each of its ends and having a non-partitioned A register transfering charge packets through one of the C registers to the partitioned B register is possible, as well as modifications of this imager to use C/2 registers instead of its C registers. It is also possible to have the B register divided into multiple bands each of a few lines long, with respective C registers, some interspersed within the B register and arranged to have charge packets transfer through them during the field transfer loading the B register, so that clocking of samples from the B register through the C registers can be done at reduced rate.

Figure 7:
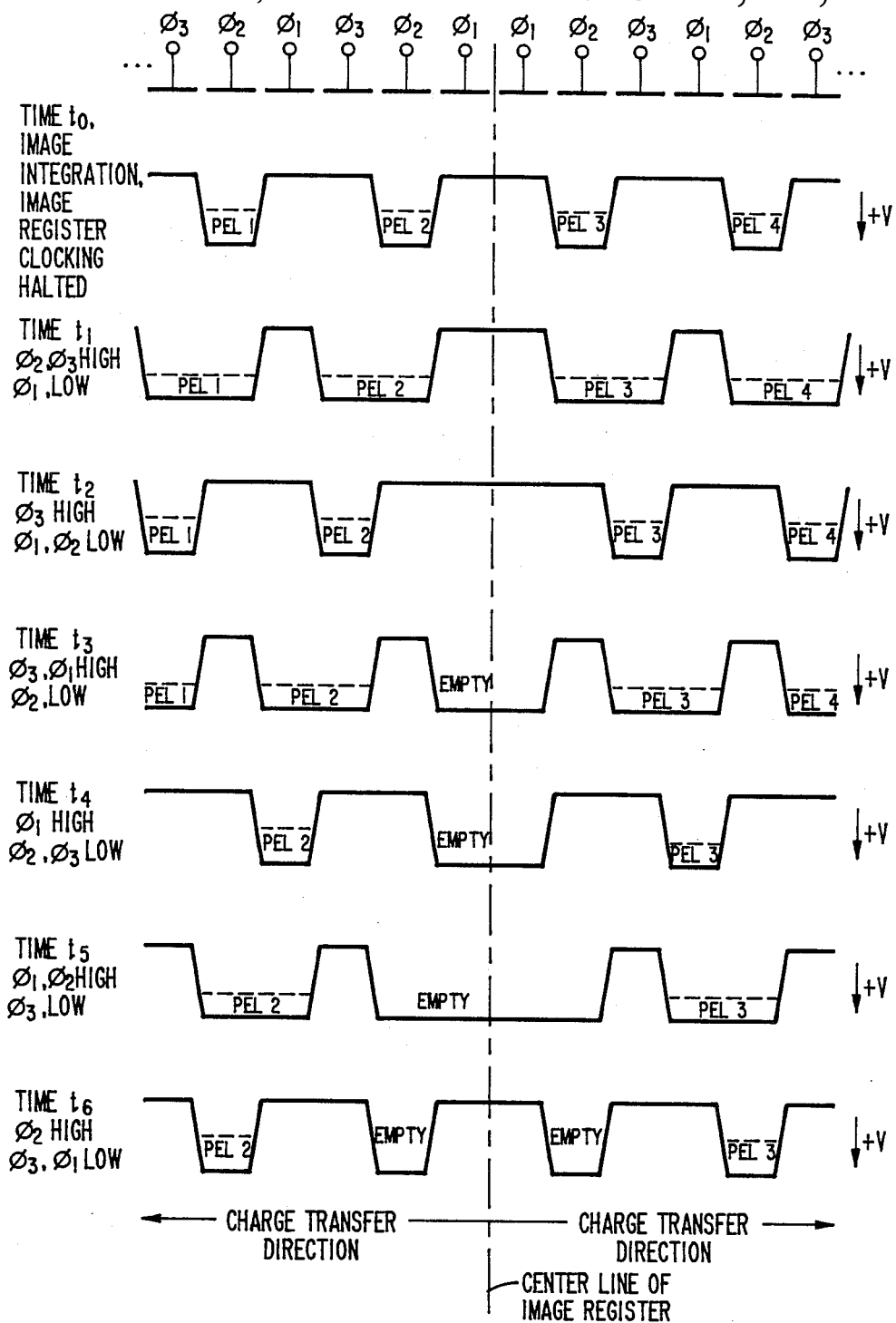
Figure 8:
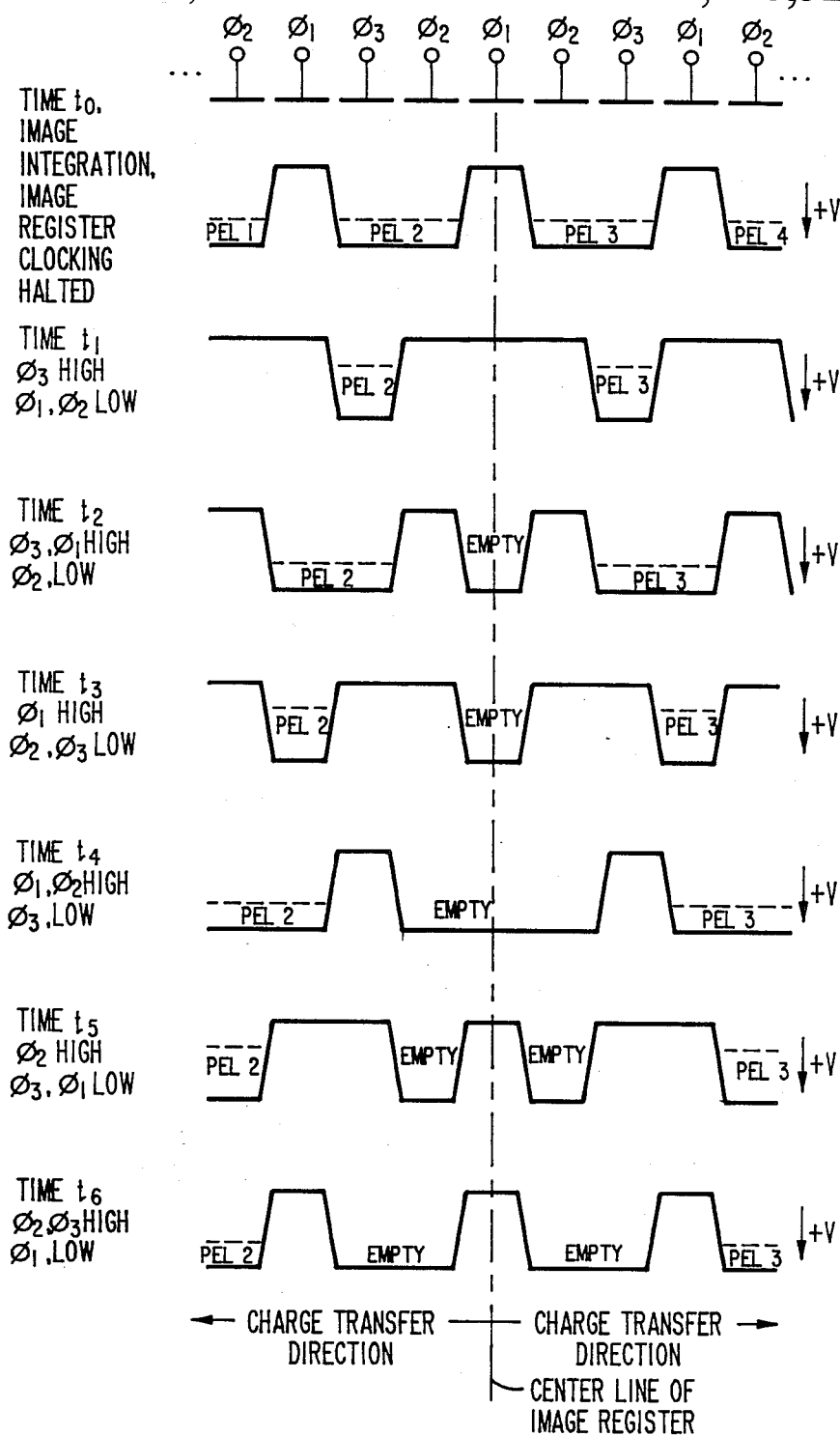
Figure 9:
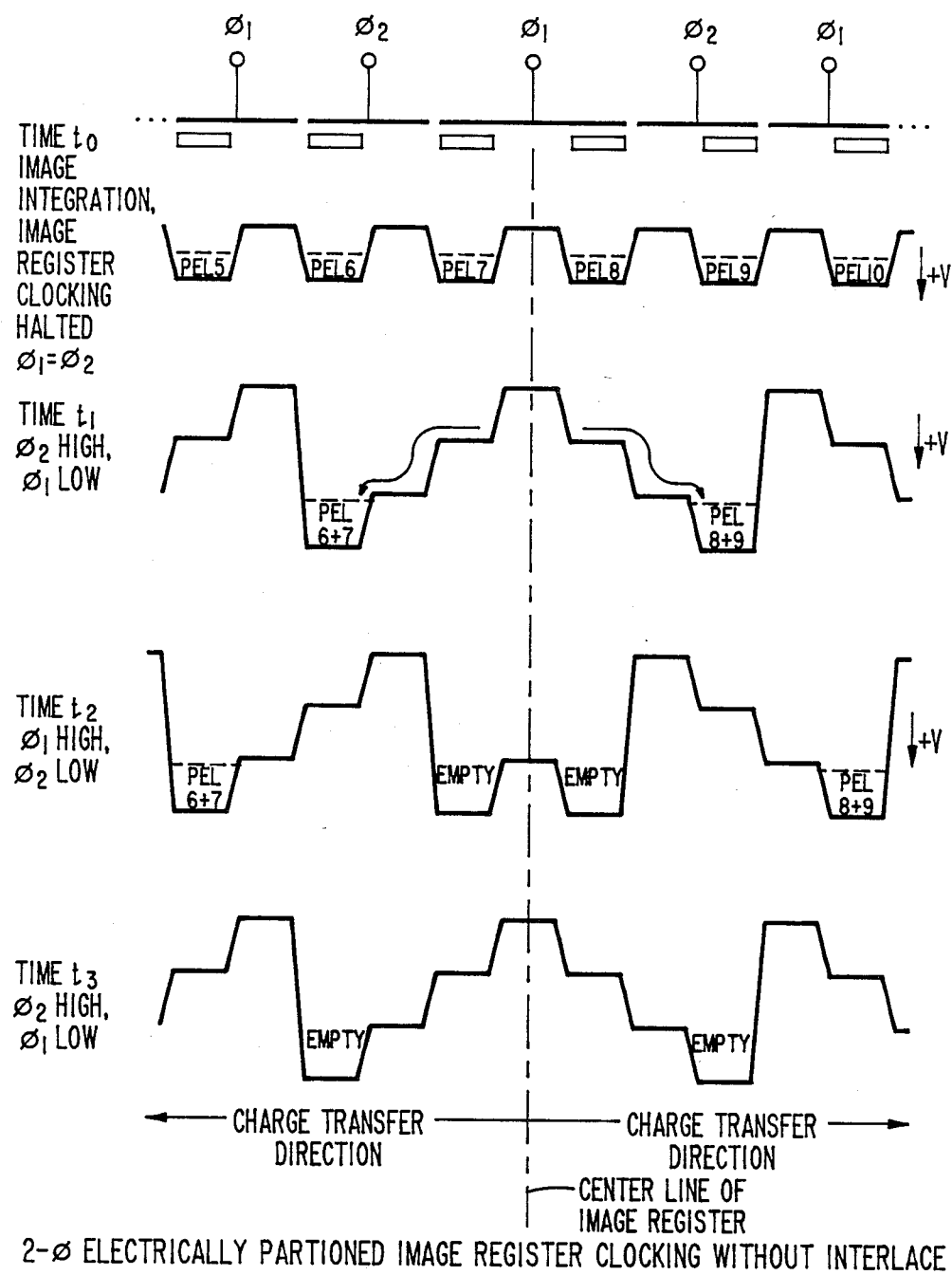

The clocking of the two A/2 registers (13, 14 or 13, 34) to transfer charge packets in opposite directions through them is less difficult to arrange when field-interlace is not used. FIGS. 7 and 8 show potential profile diagrams illustrating typical three-phase clocking arrangements; and FIG. 9 shows potential profile diagrams of a two-phase clocking arrangement. In the potential profile diagrams of this specification the potential profiles in a column of the image register are drawn extending between lefhand and righthand extremes of the FIGURE, per convention in such diagrams; and references to left or right in discussion of these diagrams will be with reference to this convention and should not be confused with left and right referred to the image plane per television convention. The potential profile diagrams are also drawn conventionally, in that increasing positive potential (+V) extends downward. The center line of the complete image register—that is, the boundary between the two A/2 registers—is shown in each clocking diagram as a succession of alternatingly long and short dashes. The gate structures of the charge transfer channel forming a column of the image register appear at the top of the clocking diagram, per convention. In the two-phase clocking the diffusions introducing directional gradients under the gates are shown as small rectangles.

In FIG. 7 the potential energy well pattern along a column of a three-phase-image register during image integration as shown as the topmost slice in time ($t_o$) of the clocking diagram, clocking being halted with the second clock phase $\phi_2$ being positive respective to the first and third clock phases $\phi_1$ and $\phi_3$. Wells for the collection of charge are induced under the gates to which $\phi_2$ clock phase is applied. Charge carriers, which have been generated by photoresponse in the region under a gate receiving relatively positive $\phi_2$ clock potential and in the regions under the flanking gates receiving relatively negative $\phi_1$ and $\phi_3$ clock potentials, are collected on the well induced under that gate receiving $\phi_2$ clock potential. Charge packets descriptive of four picture elements PEL1, PEL2, PEL3 and PEL4 are shown as having been collected under successive gates receptive of $\phi_2$ clock phase. By placing gates receptive of $\phi_1$ clock on each side of the center line of the image register these potential wells are uniformly spaced long the image register column. This, despite the order of clock phasing to left of center line of the imager register being such as to transport charge packets to the left when image register clocking resumes, and the order of clock phasing to right of center line of the image register being such as to transport charge packets to the right when image register clocking resumes.

The next six slices in time $t_1$, $t_2$, $t_3$, $t_4$, $t_5$ and $t_6$ represent successive times in the first full clocking cycle when image register clocking is resumed. (Times $t_1$, $t_3$ and $t_5$ are transition times, and the normal departures from the ideal potential profiles shown may be expected.) This clocking cycle operates to move PEL2 to the position originally occupied by PEL1, and to move PEL3 to the position originally occupied by PEL4, each movement being accomplished by standard three-phase clocking technique. The positions previously occupied by PEL2 and by PEL3 are left empty (except for integrated dark current which is accounted negligibly small).

FIG. 8 shows clocking in opposite directions in a three-phase image register where during image integration time $t_o$ clocking is halted with clock phases $\phi_2$ and $\phi_3$ both positive respective to phase $\phi_1$. Integrating under gate pairs reduces partitioning noise that appears as grain, this noise being associated with increased length of the gate structure under which charge is not allowed to collect. But dark current contribution to each pel is increased.

Note the two halves of the image register abut at the center of a $\phi_1$ gate held low during image integration; and the normal $\phi_1$, $\phi_2$, $\phi_3$ gate cycle continues in each direction from this central $\phi_1$ gate. When A register clocking resumes, during field transfer in the field retrace interval, the integrated charge in packets under the $\phi_2$ gates is combined with the integrated charge in packets under the succeeding $\phi_3$ gates, as $\phi_2$ clock goes low while $\phi_3$ clock remains high at time $t_1$. At time $t_2$, when $\phi_1$ clock goes high, an empty wall appears under central $\phi_1$ gate. Later on at time $t_5$, this empty well splits to fill positions behind PEL2 on the lefthand side of the register and behind PEL3 on the righthand side of the register.

In FIG. 9 the potential energy well pattern along a column of a two-phase image register is shown as the topmost slice in time ($t_o$) of the clocking diagram, clocking being halted with $\phi_1$ and $\phi_2$ clock phase being held at same voltage. In the lefthand portion of the image register, wells for the collection of charge are induced under the lefthand portions of the gates by the diffusions disposed thereunder; and in the righthand portion of the image register, such wells are induced under the righthand portions of the gates by the diffusions disposed thereunder. The gate electrode through which the center line of the image register passes is half again or so as wide as the other gate electrodes and has diffusions disposed under each of its edges to induce wells for the collection of charge under each of its edges. The potential barrier in the central portion of this gate is the decision point where it is determined whether charge is collected in the upper half of the image register or in its lower half. To the left of the center line of the image register, the diffusions disposed under the lefthand portions of the gate electrodes cause drift fields under those gates that tend to propel charge carries in a leftward direction along the channel when clocking resumes. To the right of the center line of the image register, the diffusions gradients disposed under the lefthand portions of the gate electrodes cause drift fields under those gates that tend to propel charge carriers in a rightward direction along the channel when clocking resumes. Clocking is resumed with the clocking phase applied to the gate through which the center line of the image register passes being initially being "low" (relatively negative) to maintain the potential energy barrier under its central portion as the decision point for charge propagation during image transfer, as well as for its collection during image integration.

Charge packets descriptive of six picture elements are shown as having been collected under six successive gates during time $t_0$. Three picture elements PEL5, PEL6 and PEL7 are collected to the left of image register center line; and three picture elements PEL8, PEL9 and PEL10 are collected to the right of image register center line.

When clocking resumes to place $\phi_1$ relatively negative and $\phi_2$ relatively positive in potential at time $t_1$, PEL7 is transferred left to merge with PEL6 since the potential energy level under the lefthand portions of the gates on the lefthand side of the image register is lower than the level under their righthand portions. PEL5 is also transferred left to off-drawing and merges with the charge packet descriptive of the pel immediately to its left. On the right side of the image register, PEL8 is transferred further right to merge with PEL9; and PEL 10 is transferred right to off-drawing to merge with the charge packet descriptive of the pel immediately to its right. Transfer is to the right since the potential energy level under the righthand portions of the gates on the righthand side of the image register is lower than the level under their lefthand portions.

When $\phi_1$ then goes high and $\phi_2$ low at time $t_2$, empty wells appear under the edges of the $\phi_1$ gate through which image register center line passes. The combined pels (such as PEL8 and PEL9) on the righthand side of the image register, transfer further right. PEL9. On the lefthand side of the image register combined pels (such as PEL6 and PEL7) transfer further left.

Thereafter, at time $t_3$, $\phi_1$ goes low and $\phi_2$ goes high. Combined pels PEL6 and PEL7 are transferred further left off-drawing and the empty well on the lefthand side of the image register also is transferred further left to occupy the position combined pels PEL6 and PEL7 formerly occupied at time $t_1$. The empty well on the righthand side of the image register is transferred further right to occupy the position formerly occupied by combined pels PEL8 and PEL9 at time $t_1$, and the combined pels on the righthand half of the register are transferred further right off-drawing.

Subsequent potential profile diagrams following those in each of FIGS. 7, 8 and 9 should be evident to one skilled in the art, conforming to standard three-phase and two-phase clocking practice. Possible variants of the clocking schemes shown in FIGS. 7, 8 and 9 will with benefit of this disclosure suggest themselves to one skilled in the art. In FIG. 7 the two gates immediately adjacent to the center line of the register may be d-c gates permanently biased low, for example. In FIG. 9 the $\phi_1$ gate next to image register center line may be replaced by a d-c gate permanently biased low or by a blooming drain, as further examples.

While FIGS. 7-9 have been considered in relation to one column of a partitioned image register (which is an array register) they also can be considered descriptive of a partitioned C register (which is a line register). Rather than charge being generated by photo-response, charge is admitted to the partioned C register in parallel packet format from the imager B register or a portion thereof.

Consider now how a split image register with its portions clocked to transfer charge packets in opposite directions can be operated so as to accomodate field interlace.

FIG. 10 has portions (a) and (b) descriptive of image register clocking during odd-numbered field operation and during even-numbered field operation respectively. $\phi_1$, $\phi_2$ and $\phi_3$ are successive three-phase clock voltages for the righthand half of the image register; and $\phi_4$, $\phi_5$ and $\phi_6$ are successive three-phase clock voltages for the lefthand half of the image register. During image integration (e.g. at time $t_0$ in the odd-numbered field and at time $t_0'$ in the even-numbered field) when image register clocking is halted, the gate electrodes receptive of $\phi_1$, $\phi_2$ and $\phi_3$ clocking voltages during field transfer are respectively biased similarly to the gate electrodes receptive of $\phi_4$, $\phi_5$ and $\phi_6$ clocking voltages during field transfer.

Holding only $\phi_2$ and $\phi_5$ gates high during image integration in odd-numbered fields and holding only $\phi_3$ and $\phi_4$ gates high during image integration in even-numbered fields would implement the well known "two-thirds" interlace; and there would be a disruption from field to field in pel sizes near the center line of the image register. D. F. Battson in his U.S. Pat. App. Ser. No. 472,566 filed 7 Mar. 1983, entitled REDUCING GRAIN IN MULTI-PHASE-CLOCKED CCD IMAGERS, and assigned to RCA Corporation, teaches a modification of two-thirds interlace operation. Applying that modification to the imager of FIGS. 10(a) and (b), during image integration $\phi_1$ and $\phi_6$ gates are held at a bias level intermediate between the bias level applied to the $\phi_2$ and $\phi_5$ gates and the bias level applied to the $\phi_3$ and $\phi_4$ gates. This, in accordance with one of Battson's teachings, reduces grain noise in the imager output signal. Not only that, but more importantly here, the intermediate bias level applied to $\phi_1$ and $\phi_6$ gates is adjusted to perturb two-thirds interlace so as to provide perfect interlace at an average energy well content, in accordance with another of Battson's teachings.

With this image integration scheme, in order to clock charge packets in opposite directions in the two halves of the image register during field transfer times, the correspondence of $\phi_4$, $\phi_5$ and $\phi_6$ clock phases to $\phi_1$, $\phi_2$ and $\phi_3$ clock phases must change from field to field and must differ from the correspondence of bias levels applied to the sets of gates during image integration. Time $t_1$ in the odd-numbered field and time $t_1'$ in the even-numbered field mark the times of transition from image integration to field transfer. In the odd-numbered field transfer $\phi_4$, $\phi_5$ and $\phi_6$ clock phases are synchronous with $\phi_1$, $\phi_2$ and $\phi_3$ clock phases, respectively. In the even-numbered field transfer $\phi_4$, $\phi_5$ and $\phi_6$ clock phases are synchronous with $\phi_3$, $\phi_1$ and $\phi_2$ clock phases respectively.

During field transfer, the B/2 register receptive of charge packets from the right-hand half of the image register will be synchronously clocked with the same $\phi_1$, $\phi_2$, $\phi_3$ clock phases applied to that A/2 register. And the B/2 register receptive of charge packets from the lefthand half of the image register will be synchronously clocked with the same $\phi_4$, $\phi_5$, $\phi_6$ clock phases applied to the A/2 register. The relative lengths of time the A/2 and their corresponding B/2 registers are synchronously clocked during field transfer are adjusted respective to each other for odd-numbered fields and for even-numbered fields to position charge packets in the correct rows of the B/2 registers for implementing read-out through their respective C registers during field trace.

Figure 11A:
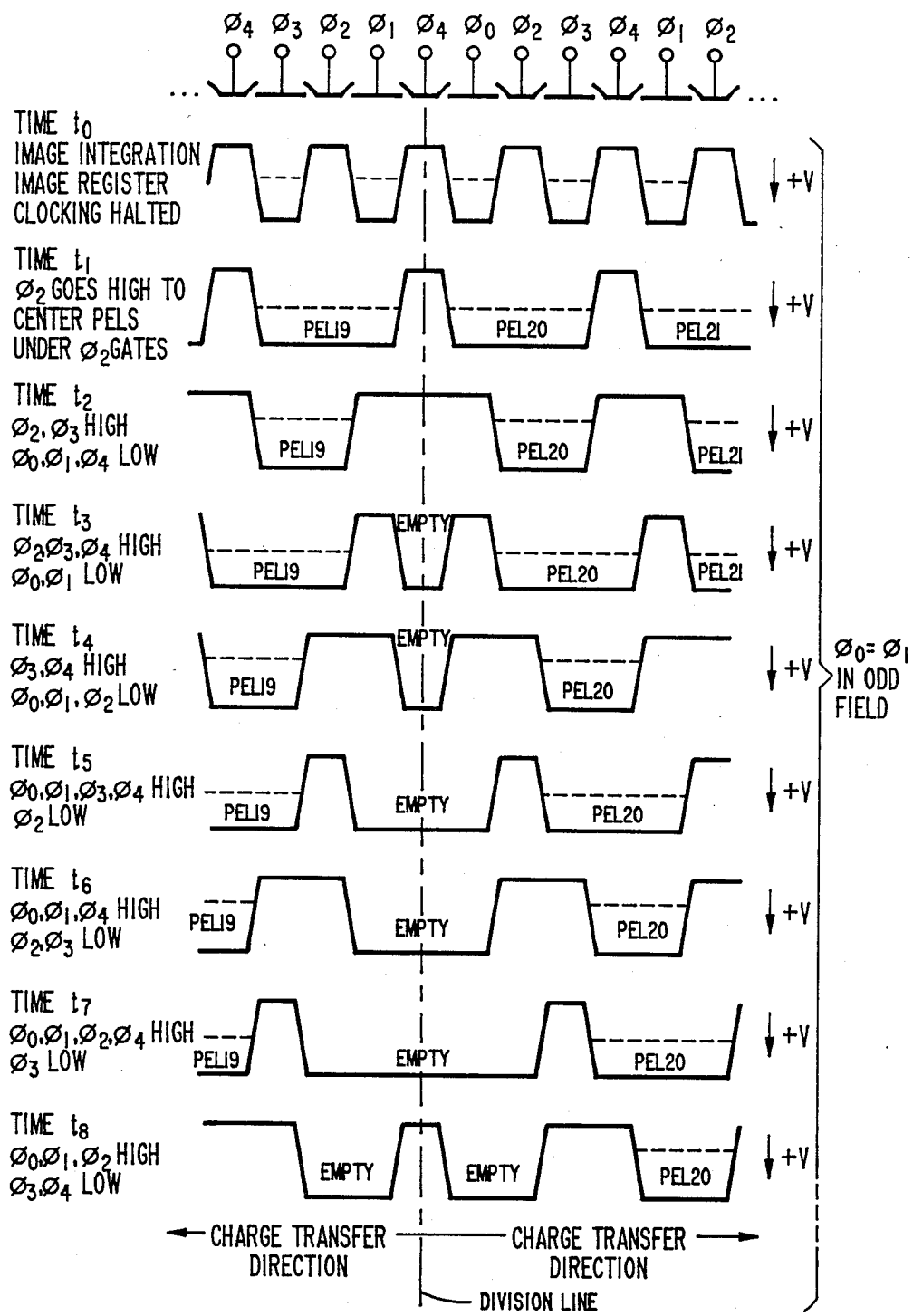

FIGS. 11(a) and 11(b) illustrate how a four-phase double-clocked image register can be arranged to have field interlace in the direction perpendicular to line scan. During image integration times $t_0$ in odd fields and $t_0'$ in even fields, both the clock phases $\phi_2$ and $\phi_4$ are held low in potential to reduce the collection of dark current in the imager, while the other clock phases $\phi_0$, $\phi_1$ and $\phi_3$ are held in potential. So image integration proceeds with the same potential profiles in the imager charge transfer channels for both odd and even fields. In odd fields, at time $t_1$, when image integration in the image (A) register has been completed and transfer of the image samples from the image (A) register to the field storage (B) register will next occur, $\phi_2$ is made high in potential. This merges charges in pairs of collection wells so as to place pel centers under the $\phi_2$ gate electrodes. In even fields, on the other hand, at time $t_1'$, when image integration has been completed and field transfer will take place next, $\phi_4$ is made high in potential. This merges charges in pairs of collection wells so as to place pel centers under $\phi_4$ electrodes. This results in perfect 2:1 flicker-free interlace in a variation of the teaching of inventor W. F. Kosonocky in U.S. Pat. No. 3,932,775 issued 13 Jan. 1976 and entitled INTERLACED READOUT OF CHARGE STORED IN A CHARGE COUPLED IMAGE ARRAY.

Then, during field transfer times, in odd fields and in even fields, the clock phases $\phi_1$, $\phi_2$, $\phi_3$ and $\phi_4$ are successively high, are applied cyclically in named order starting with $\phi_2$ in the portion of the image register shown right of center in FIGS. 11(a) and (b), and are applied cyclically in reverse of named order starting with $\phi_4$ in the portion of the image register shown left of center in FIGS. 11(a) and 11(b). The novel feature of special interest is a gate electrode at the center of the image register receiving a clock-phase $\phi_0$, which is like $\phi_1$ during the integration of the odd-field image and its subsequent transfer from image register, and which is like $\phi_3$ during the integration of the even-field image and its subsequent transfer from image register.

The four-phase double-clocked A register of FIGS. 11(a) and 11(b) can be used with a four-phase double-clocked B register or with a two-phase B register. Obviously, modifications can be made to the four-phase double-clocked A register for operating it as a two-phase register, with the $\phi_0$ gate electrode continuing to be clocked differently on alternate fields.

The CCD imagers specifically considered thusfar in the specification have all been field transfer type. The advantages of the invention having to do with allowing the reduction of the C register clocking rate are also applicable with regard to other types of CCD imager, such as the interline transfer type.

Figure 12:
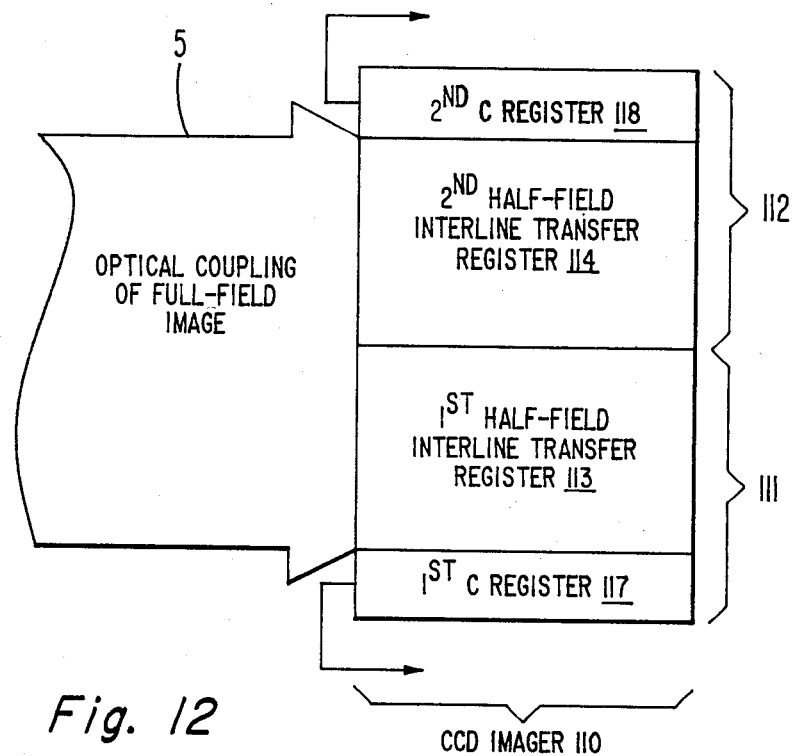

FIG. 12 shows a CCD imager 110 of interline transfer type, constructed in accordance with the invention to adapt it for use in the apparatuses of FIGS. 1 and 5 instead of CCD imager 10 of field transfer type. In a first half 111 thereof imager 110 has a first half-field interline transfer register 113 and an associated first output, or C, register 117; and in a second half 112 thereof imager 110 has a second half-field interline transfer register 114 and an associated second output, or C, register 118. First half-field transfer register 113 comprises a parallel array of charge transfer channels in masked columns, analogous in function to the B/2 register 15 of imager 11. Alongside each charge transfer channel is an unmasked column of photosensor devices from which charge packets are selectively transferred, at the end of image integration intervals, to adjacent positions in the charge transfer channel. During field trace, when integration of the top portion of the image received via optical coupling 5 is progressing in the photosensor devices of register 111 (inverting optics being presumed), during selected line trace intervals charge packets are advanced a row at a time through the charge transfer channels of register 111 with one row of charge packets being transferred in parallel out of register 111 into a parallel-to-serial converting line register, or C register, 117. Each row of charge packets so transferred is then read out serially during the following line trace in the FIG. 5 apparatus (or the following two line traces in the FIGURES apparatus. Imager 110 also has a second half-field interline transfer register 112 comprising a parallel array of charge transfer channels in masked columns inter-leaved with unmasked columns of photosensors for integrating the other half of image received through optical coupling 5. During selected line retrace intervals in field trace, charge packets are advanced a row at a time in the charge transfer channels of register 112 with one row being loaded in parallel into a C register 118 to be serially read out during the following line trace in the FIG. 1 apparatus (or the following two line traces in the FIG. 5 apparatus).

That is, during read out of charge packets, the clocking of the charge transfer channels in field transfer registers 113 and 114 is analogous to that of B/2 registers 15 and 16 of imager 110; and the clocking of C registers 117 and 118 is analogous to that of C registers 17 and 18 of imager 10. The output signals supplied from C registers 117 and 118 of imager 10 essentially correspond to the output signals serially supplied from C registers 17 and 18 of imager 10.

Figure 13:
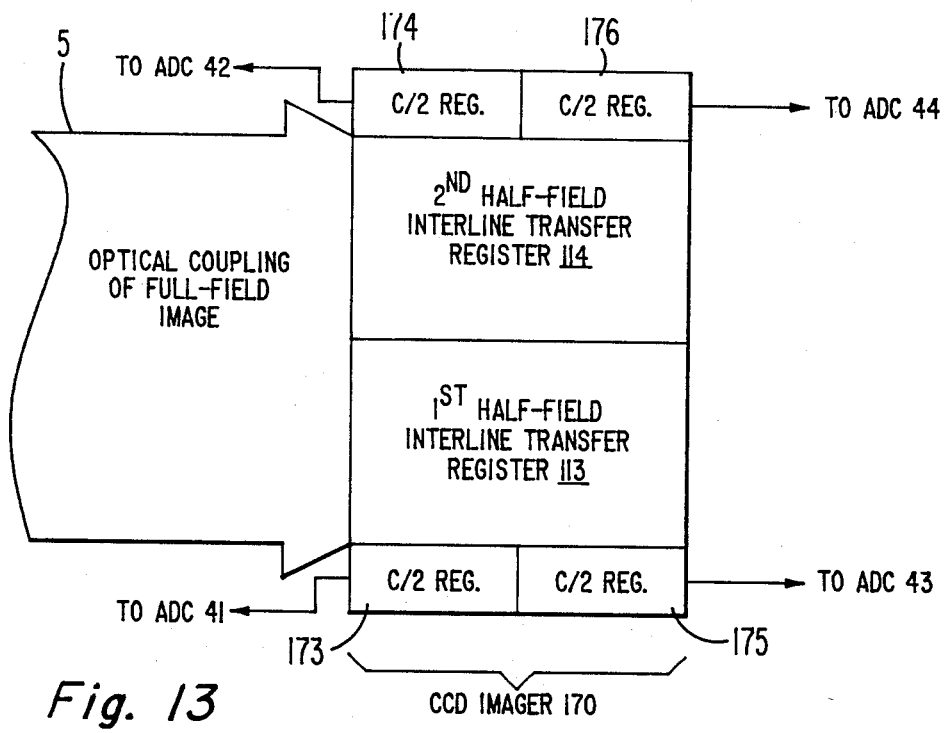

FIG. 13 shows a CCD imager 170 of interline transfer type, constructed in accordance with the invention to adapt it for use in the apparatus of FIG. 6 instead of CCD imager 70 of field transfer type. Imager 170 differs from imager 110, in that C/2 registers 173 and 175 replace C register 117, and in that C/2 registers 174 and 176 replace C register 118. C/2 registers 173, 174, 175 and 176 of imager 170 supply output signals respectively analogous to the output signals supplied by C/2 registers 73, 74, 75 and 76 of imager 70.

Of particular interest in interline transfer CCD imagers 110 and 170 is the way in which one provides for the partitioning between the charge transfer channels in register 111 and the charge transfer channels in register 112 aligned therewith. Physical separation of the abutting ends of the charge transfer channels in registers 111 and 112 could be provided by a channel stop diffused into the semiconductor substrate in which the charge transfer channels are selectively induced. However, such physical separation and the spatial misalignment of the photosensor array and the array of potential wells in the charge transfer channels to which charge packets are transferred at the end of image integration are avoided using the electrical separation methods described earlier in this specification.

Where the charge transfer channels of half field interline transfer registers 111 and 112 are clocked two-phase, for example, the gated transfer of charge packets from photosensors at the end of image integration to each charge transfer channel they share can be to potential wells defined as at time $t_1$ in the FIG. 9 charge transfer channel. Clocking of registers 111 and 112 continues as at time $t_2$, $t_3$ et seq. Where the charge transfer channels of registers 111 and 112 are clocked three-phase, charge packets can be transferred at the end of image integration by gating at the end of image integration to potential wells in each charge transfer channel they share defined as at time $t_0$ in either of FIGS. 7 and 8.

What is claimed is:

1. In combination:
   one or more CCD charge transfer channels having a plurality of parallel gate electrodes in an overlying array thereacross;
   means for introducing charge packets into charge transfer stages induced in each said CCD charge transfer channel responsive to the application of static clocking signal voltages in recurring cyclic pattern to said parallel gate electrodes; and
   means for periodically removing said charge packets from each said CCD charge transfer channel responsive to the application at selected times of dynamic clocking signal voltages in recurring cyclic pattern to said parallel gate electrodes, which means includes
   means for applying at said selected times clocking voltages to said parallel gates so phased as to simultaneously propagate charge packets towards both ends of each charge transfer channel.

2. The combination set forth in claim 1 wherein charge packets are during selected charge transfer intervals propagated in both directions from the centers of a plurality of said charge transfer channels arrayed in parallel within the image register of a CCD imager.

3. The combination as set forth in claim 1, further including:
means for irradiating at least selected portions of each charge transfer channel for generating said charge packets therein by photogeneration.

4. At least one CCD charge transfer channel having a plurality of parallel gate electrodes thereacross, in combination with:
means for applying a selected times clocking voltages in said parallel gate electrodes so phased as to simultaneously propagate charge packets towards both ends of each charge transfer channel; and
means for selectively introducing, at times preceding said selected times, charge packets into respective positions in each said charge transfer channel between its ends.

5. In a three-phase-clocked CCD register of the type having:
a semiconductor substrate,
channel stop means for defining a charge transfer channel in said substrate, and
a succession of gate electrode structures running parallelly across said charge transfer channel
the improvement allowing simultaneous propagation of charge packets in opposite directions in said charge transfer channel away from a point therein, which improvement is provided by:
means for applying the first of three successive phases of clocking voltage to a pair of gate electrodes flanking said point and to every third electrode on the leading side of each of these gate electrodes in the respective directions of propagation away from said point,
means for applying the second phase of clocking voltage to each gate electrode on the trailing side of a gate electrode having said first phase of clocking voltage applied thereto,
means for applying the third phase of clocking voltage to each gate electrode on the trailing side of a gate electrode having said second phase of clocking voltage applied thereto,
means for periodically halting clocking to provide potential energy wells for charge carriers solely under gate electrodes receiving said second phase of clocking voltage, and
means for introducing charge into said potential energy wells provided during said periodic halting of clocking.

6. In a three-phase-clocked CCD register of the type having:
a semiconductor substrate,
channel stop means for defining a charge transfer channel in said substrate, and
a succession of gate electrode structures running parallelly across said charge transfer channel
the improvement allowing simultaneous propagation of charge packets in opposite directions in said charge transfer channel away from a point therein, which improvement is provided by:
means for applying the first of three successive phases of clocking voltage to an initial gate electrode that overlies said point and to every third gate electrode in the directions of charge propagation away from said initial gate electrode,
means for applying the second phase of clocking voltage to gate electrodes following, in the directions of charge propagation, the gate electrodes in which said first phase of clocking voltage is applied,
means for applying the third phase of clocking voltage to gate electrodes following in the directions of charge propagation the gate electrodes to which said second phase of clocking voltage is applied,
means for periodically halting clocking to provide potential energy wells for charge carriers under adjoining gate electrodes respectively receiving said second and third phases of clocking voltage, and
means for introducing charge into said potential energy wells provided during said periodic halting of clocking.

7. In a two-phase-clocked CCD register of the type having:
a semiconductor substrate,
channel stop means for defining a charge transfer channel in said substrate,
a succession of gate electrode structures running parallelly across said charge transfer channel,
means for applying the first phase of clocking voltage to alternate ones of said gate electrodes in said succession during charge transfer times,
means for applying the second phase of clocking voltage to the remaining gate electrodes in said succession during charge transfer times, and
means for applying equal voltages to all the gate electrodes at selected times when clocking is halted
the improvement allowing simultaneous propagation of charge packets in opposite directions in said charge transfer channel away from a point therein, under an initial one of its gate electrodes located within said succession, to which initial gate electrode said first clocking phase is applied, which improvement is provided by:
the initial gate electrode being substantially half again as long as the other gate electrodes,
the substrate under the center of said initial gate electrode being differentially doped with respect to its edges to encourage the flow of charge carriers away from the center of said initial gate electrode,
the substrate under the trailing and leading edges of the other gate electrodes being differentially doped to encourage the flow of charge carriers from their trailing to their leading edges, and
means for resuming clocking after halting, which means resumes clocking in the one of the two phases which encourages charge carriers to flow to potential energy wells under the gate electrode to which said second phase of clocking voltages is applied.

8. In a three-phase-clocked CCD imager image register of the type having:
a semiconductor substrate,
channel stop means for defining at least one charge transfer channel in said substrate, and
a succession of gate electrode structures running parallelly across each said charge transfer channel
the improvement allowing simultaneous propagation of charge packets in opposite directions in each said charge transfer channel away from a point therein, and at the same time providing field interlace, which improvement is provided by:
means for applying, during periods between charge transfer intervals alternately odd-numbered and even-numbered, a potential to every third gate electrode in said succession, which potential is intermediate between the potential to induce a potential energy well and the potential to erect a potential energy barrier;

means for applying said potential to induce a potential well, applying that potential to each gate electrode on one side of each of those every third electrodes, on the first side during odd-numbered ones of said periods between charge transfer intervals, and on the second side opposite the first during even-numbered ones of said periods between charge transfer intervals;

means for applying said potential to erect a potential barrier, applying that potential to each gate electrode on one side of each of these every third electrodes, on the second sides during odd-numbered ones of the periods between charge transfer intervals, and on the first side during even-numbered ones of the periods between charge transfer intervals;

means for applying, during charge transfer intervals, clocking voltage to the gate electrodes of the portion of said CCD image register closest to a first end thereof, which means includes:

means for then applying the first of three successive phases of the clocking voltage to said every third gate electrode in the portion of the CCD image register closest to its first end, means for then applying the second phase of the clocking voltage to the gate electrodes next to and on the first sides of those every third electrodes, and means of then applying the third phase of the clocking voltage to the gate electrodes next to and on the second sides of those every third electrodes;

means for applying during charge transfer intervals following an odd-numbered period between charge transfer intervals, clocking voltage to the gate electrodes of the portion of said CCD image register closest to a second end thereof opposite its first end, which means includes:

means for then applying the third phase of the clocking voltage to said every third gate electrode in the portion of the CCD imager closest to its second end, means for then applying the second phase of the clocking voltage to the gate electrodes next to and on the first sides of those every third electrodes, and means for then applying the first phase of the clocking voltage to the gate electrodes next to and on the second sides of those every third electrodes, and means for applying during charge transfer intervals following an even-numbered period between charge transfer intervals, clocking voltage to the gate electrodes of the portion of said CCD image register closest to a second end thereof opposite its first end, which means includes means for then applying the second phase of the clocking voltage to said every third gate electrode in the portion of the CCD imager closest to its second end, means for then applying the first phase of the clocking voltage to the gate electrodes next to and on the first sides of those every third electrodes, and means for then applying the third phase of the clocking voltage to the gate electrodes next to and on the second sides those every third electrodes.

9. In a four-phase-clocked CCD register of the type receiving successive first, second, third and fourth phases of clocking voltage and having:

a semiconductor substrate, channel stop means for defining a charge transfer channel in said substrate, and a succession of gate electrode structures running parallelly across said charge transfer channel the improvement allowing simultaneous propagation of charge packets in opposite directions in said charge transfer channel away from an initial one of said gate electrodes within said succession, which improvement comprises:

means for applying the fourth phase of clocking voltage to the gate electrode immediately next to and on a first side of said initial gate electrode;

means for applying said first phase, second phase, third phase and fourth phase of clocking voltage in cyclic order to respective further gate electrodes on the first side of said initial gate electrode;

means for applying the second phase of clocking voltage to the gate electrode immediately next to and on a second side of said initial gate electrode;

means for applying said third phase, said fourth phase, said first phase and said second phase of clocking voltage in cyclic order to respective further gate electrodes on the second of said initial gate electrode;

means for periodically halting clocking to provide potential barriers solely under gate electrodes receiving one or the other of said second and fourth phases of clocking voltage; and means for applying the other phase of clocking voltage to said initial gate electrode.

10. An improved four-phase-clocked CCD imager as set forth in claim 9 further comprising means for providing, during a first set of alternate periods of halting clocking, potential barriers under the gate electrodes receiving said second phase of clocking voltage; and means for providing during a second set of alternate periods of halting clocking interlaced with said first set, potential barriers under gate electrodes receiving said fourth phase of clocking voltage.

11. In a CCD imager of field transfer type having an image or A register responding to a radiant energy image to generate fields of charge samples, a field storage or B register for storing successive fields of charge samples transferred thereto from said A register, and at least one parallel-to-series-converting line or C register each used for removing charge packets in parallel format from a respective portion of said B register the improvement wherein each said C register is arranged for simultaneous propagation of charge packets therethrough in two opposing directions, for providing two outputs in serial format.

12. A CCD imager of field transfer type improved to divide its image storage register into $2^n$ portions each supplied with a respective line register as a parallel-to-serial-converting output register, n being a positive integer, and combined with:

means for clocking said line registers at $\frac{1}{2}^n$ normal video sampling rate during their read out, and a scan converter converting the $2^n$ sample streams at $\frac{1}{2}^n$ normal video sampling rate supplied from said line registers to a single stream of video samples at normal video sampling rate.

13. A CCD imager of field transfer type comprising:
a full-field image or A register arranged to generate sampled photoresponse to a radiant energy image projected thereon and composed of first and second half-field portions or A/2 registers, having abutting first ends and opposing second ends;
a first half-field storage or B/2 register having a first end arranged for parallel transfer of charge thereto from the second end of said first A/2 register during field retrace and having a second end opposite its first;
a second half-field storage or B/2 register having a first end arranged for parallel transfer of charge thereto from the second end of said second A/2 register during field retrace and having a second end opposite its first A/2 register;
respective means for reading each of said first and second B/2 registers line-by-line during field retrace; and
means for combining the read-outs from those respective means to provide regularly scanned samples of response to said radiant energy image.

14. A CCD imager as set forth in claim 13 wherein the means for reading said first B/2 register line-by-line during field trace includes a first line register parallelly loaded from the second end of said first B/2 register during line retraces occurring in the earlier half of field trace and serially read out during the ensuing line traces.

15. A CCD imager as set in claim 14 wherein the means for reading said second B/2 register line-by-line during field trace includes:
a second line register parallelly loaded from the second end of said second B/2 register during line retraces occurring in the earlier half of field trace and serially read out during the ensuing line traces; and wherein the means for combining includes:
an auxiliary half-field store written in a given line sequence by the output of said second line register during the earlier half of field trace and read in opposite line sequence during the latter half of field trace and
a half-field-rate multiplexer selecting said first line register read-out during the earlier half of field trace and said auxiliary half-field store read-out during the latter half of field trace.

16. A CCD imager as set forth in claim 14 wherein the means for reading said second B/2 register line-by-line during field trace includes:
a second line register interposed between the second end of said second A/2 register and the first end of said second B/2 register, said second line register being arranged for parallel loading and unloading when charge is transferred in parallel from said second A/2 register to said second B/2 register, said second line register being arranged for parallel loading a line at a time during line retraces in the latter half of field trace and serial read-out during the ensuing line traces; and wherein the means for combining read-outs includes:
a half-field-rate multiplexer selecting said first line register read-out during the earlier half of field trace and said second line register read-out during the latter half of field trace.

17. In a CCD imager having:
an image register, for accumulating one or more lines of charge samples responsive to a radiant energy image during times when said image register has static clocking signal voltages applied thereto, and for transferring said accumulated charge samples in parallel therefrom during times said image register has dynamic clocking signal voltages applied thereto;
a line register to which each line of charge samples is clocked in parallel and from which each line of charge samples is serially transferred; and
a first charge converting output stage for converting serially transferred charge samples to a first electric output signal—the improvement wherein said line register is partitioned into halves, charge samples transferred in parallel to one half of said line register continuing to be clocked during serial transfer to said first charge converting output stage, and charge samples transferred in parallel to the other half of said line register being clocked during serial transfer to a second charge converting output stage for being converted to a second electric output signal.

18. A CCD imager as set forth in claim 17 wherein the serial transfers to said first and second charge converting stages are in opposing directions.

19. A CCD imager as set forth in claim 18 wherein the serial transfers to said first and second charge converting stages take place during the same time interval.

20. A CCD imager as set forth in claim 19 wherein the partitioning of said line registers is carried forth solely in response to applied clocking voltages with no physical barrier to charge transfer between the register halves.

21. A CCD imager as set forth in claim 17 wherein the serial transfers to said first and second charge converting stages take place during the same time interval.

22. A CCD imager comprising:
an image register for accumulating one or more lines of charge samples responsive to a radiant energy image;
means for recurrently clocking forward a subsequent one of the lines of accumulated charge samples, the samples in each line being clocked forward in closely-packed parallel array;
a line register to which the charge samples in each line are clocked in parallel by said means for recurrently clocking forward and from which each line of charge samples is serially transferred; and
first and second charge converting output stages at opposite ends of said line register, said first charge converting output stage for converting charge samples serially transferred thereto to a first electric output signal, and said second charge converting output stage for converting charge samples serially transferred thereto to a second electric output signal—wherein said line register is partitioned into halves, charge samples transferred in parallel to one half of said line register continuing to be clocking during serial transfer therefrom to said first charge converting output stage, and charge samples transferred in parallel to the other half of said line register being clocked during serial transfer therefrom to said second charge converting output stage; wherein the serial transfers to said first and second charge converting stages take place simultaneously; and wherein the partitioning of said line register is carried forth solely in response to applied clocking voltages, with no physical barrier to charge transfer between the register halves, to accommodate said closely-packed parallel array of charge samples being forward clocked into respective ones of its charge transfer stages.

23. A CCD imager of interline transfer type comprising:
a full-field interline transfer register arranged to generate sampled photoresponse to a radiant energy image projected thereto and composed of first and second half-field portions having abutting first ends and opposing second ends;
respective means for reading each of said first and second interline transfer registers line-by-line from their respective second ends during field trace; and
means for combining the read-outs from these respective means to provide regularly scanned samples of response to said radiant energy image.

24. A CCD imager as set forth in claim 23 wherein said respective means for reading each of said first and second half-field portions are first and second line registers abutting the second ends of said half-field portions for recieving rows of charge packets in parallel and converting them to respective serially supplied output signal samples.

25. A CCD imager as set forth in claim 24 wherein said means for combining includes:
a half field store, into which rows of output signal samples serially supplied from said second line register during line trace portions of the first half of each field trace interval are loaded in a first sequential order, and from which said rows of output signal samples are read out in a second sequential order opposite to the first; and
multiplexer means for selecting output signal samples serially supplied from said first line register during the first and earlier-in-time half of each field trace and selecting output signal samples serially supplied from said half field store during the second and later-in-time half of each field trace.

26. A CCD imager as set forth in claim 24 wherein said means for combining includes:
a first scan converter for converting samples read-out from said first line register in a given row order during one field trace interval to samples supplied from said first scan converter in same row order during the first half of the succeeding field trace;
a second scan converter for converting samples read-out from said second line register in a given row order during one field trace interval to samples supplied from said second scan converter in opposite row order during the second half of the succeeding field trace; and
multiplexer means for selecting output signal samples from said first scan converter the first and earlier-in-time half of each field trace and for selecting output signal samples from said second converter the second and later-in-time half of each field trace.

27. A CCD imager as set forth in claim 23 wherein said respective means for reading each of said first and second half-field portions are
a first pair of line registers abutting respective halves of the second end of said first half-field portion and
a second pair of line registers abutting respective halves of the second end of said second half-field portion.

28. A CCD imager as set forth in claim 22 in combination with:
a scan converter receptive of parallelly supplied said first and second electric output signals over the period of time for each of said serial transfers, for supplying a delayed response to said first electric output signal in a shortened period of time, followed by a delayed reversed-sequence response in a further shortened period of time.

29. A CCD imager as set forth in claim 19 in combination with:
a scan converter receptive of parallelly supplied said first and second electric output signals over the period of time for each of said serial transfers, for supplying a delayed response to said first electric output signal in a shortened period of time, followed by a delayed reversed-sequence response in a further shortened period of time.

30. A CCD imager as set forth in claim 21 in combination with:
a scan converter receptive of parallelly supplied said first and second electric signals over the period of time for each of said serial transfers for supplying response to an entire one of said lines of charge samples in normal line scan order within a time period of substantially the same duration as for each of said serial transfers.

31. In combination:
a CCD imager having an image register for accumulating one or more lines of charge samples responsive to a radiant energy image, having a line register to which each line of charge samples accumulated in said image register are transferred in parallel during line retrace times and from respective opposite ends of which half lines of charge samples are simultaneously transferred at one half normal pel scan rate during line trace times, and having first and second charge converting stages at said respective ends of said line register for converting the half lines of charge samples transferred thereto to a first electric output signal and to a second electric output signal; and
a scan converter, providing at normal pel scan rate delayed response to each line of said first electric output signal without change in sequence followed by delayed response to the corresponding line of said second electric output signal in reversed sequence, for arranging the delayed responses in normal line scan order.

32. In combination:
a CCD imager of field transfer type having an image or A register responding to a radiant energy image to generate fields of charge samples, a field storage or B register for storing successive fields of charge samples transferred thereto from said A register, and at least a first parallel-to-series converting line or C register for removing charge packets in parallel format from at least a portion of said B register, which imager is improved in that said first C register is arranged for simultaneous transfers of charge packets therethrough at substantially one-half normal pel scan rate in two directions to first and second charge converting stages respectively, said first and second charge converting stages responding to the charge packets respectively transferred to them for providing first and second imager output signals in serial format at said substantially one-half normal pel scan rate; and
a scan converter, providing at normal pel scan rate delayed response to each line of first imager output without change in sequence followed by delayed response to the corresponding line of second imager output signal with reversal of sequence, for arranging the delayed responses in normal line scan order.

33. A combination as set forth in claim 4, wherein said at least one charge transfer channel comprises a first charge transfer channel, and wherein said combination further includes:

a first charge converting stage at one end of said first charge transfer channel receptive of charge packets therefrom to generate a first electric output signal, a second charge converting stage at the other end of said first charge transfer channel receptive of charge packets therefrom to generate a second electric output signal, and a scan converter receptive of said first and second electric output signals for combining them to generate a third electric output signal corresponding to the output signal that would be provided from said first charge converting stage were clocking voltages applied to said parallel gate electrodes so phased as to propogate charge packets only to its end of said first charge transfer channel.

* * * * *